(12) United States Patent
Meyer

(10) Patent No.: US 10,378,621 B2
(45) Date of Patent: Aug. 13, 2019

(54) CONTINUOUSLY VARIABLE TRANSMISSION

(71) Applicant: Robert Hornblower Meyer, West Bloomfield, MI (US)

(72) Inventor: Robert Hornblower Meyer, West Bloomfield, MI (US)

(*) Notice: Subject to any disclaimer, the term of this patent is extended or adjusted under 35 U.S.C. 154(b) by 395 days.

(21) Appl. No.: 15/169,675

(22) Filed: May 31, 2016

(65) Prior Publication Data
US 2016/0273625 A1    Sep. 22, 2016

Related U.S. Application Data

(63) Continuation-in-part of application No. 14/166,336, filed on Jan. 28, 2014, now Pat. No. 9,429,217.

(51) Int. Cl.
*F16H 15/50* (2006.01)
*F16H 15/22* (2006.01)

(52) U.S. Cl.
CPC ............ *F16H 15/50* (2013.01); *F16H 15/22* (2013.01)

(58) Field of Classification Search
CPC ................................ F16H 15/50; F16H 15/22
See application file for complete search history.

(56) References Cited

U.S. PATENT DOCUMENTS

| | | | |
|---|---|---|---|
| 3,203,278 A * | 8/1965 | General | F16H 15/50 475/115 |
| 3,802,295 A * | 4/1974 | Lemmens | F16H 15/50 474/14 |
| 4,559,841 A * | 12/1985 | Chambers | F16H 15/50 475/166 |
| 4,630,494 A * | 12/1986 | Kemper | F16H 15/50 475/115 |
| 4,682,517 A * | 7/1987 | Francis | F16H 15/50 475/115 |
| 4,882,948 A * | 11/1989 | Byrnes, Jr. | F16H 15/50 475/115 |
| 4,957,474 A * | 9/1990 | Kemper | F16H 15/50 475/279 |
| 8,660,727 B2 | 2/2014 | Katou | |

(Continued)

OTHER PUBLICATIONS

International Search Report—International Application No. PCT/US17/35011.

(Continued)

*Primary Examiner* — David M Fenstermacher
(74) *Attorney, Agent, or Firm* — Panagos Kennedy

(57) ABSTRACT

A continuously variable transmission includes an input disk and output disk rotatable about a disk axis of rotation. An input ring member rotatable about an input axis of rotation engages the input disk at an input contact patch. An output ring member rotatable about an output axis of rotation engages the output disk at an output contact patch. A sum of a length of a first input contact patch vector extending from the input contact patch to the disk axis of rotation and a length of a first output contact patch vector extending from the output contact patch to the disk axis of rotation is greater than a length of at least one of a second input contact patch vector extending from the input contact patch to the input axis of rotation and a second output contact patch vector extending from the output contact patch to the output axis of rotation.

29 Claims, 20 Drawing Sheets

(56) References Cited

U.S. PATENT DOCUMENTS

| | | | |
|---|---|---|---|
| 2003/0148845 A1* | 8/2003 | Gonzalez | F16H 15/50 475/185 |
| 2014/0051540 A1* | 2/2014 | Ozaki | F16H 15/52 475/193 |
| 2014/0287868 A1 | 9/2014 | Meyer | |
| 2015/0240920 A1 | 8/2015 | Tang | |
| 2016/0273625 A1* | 9/2016 | Meyer | F16H 15/50 |

OTHER PUBLICATIONS

International Preliminary Report on Patentability—International Application No. PCT/US17/35011.

* cited by examiner

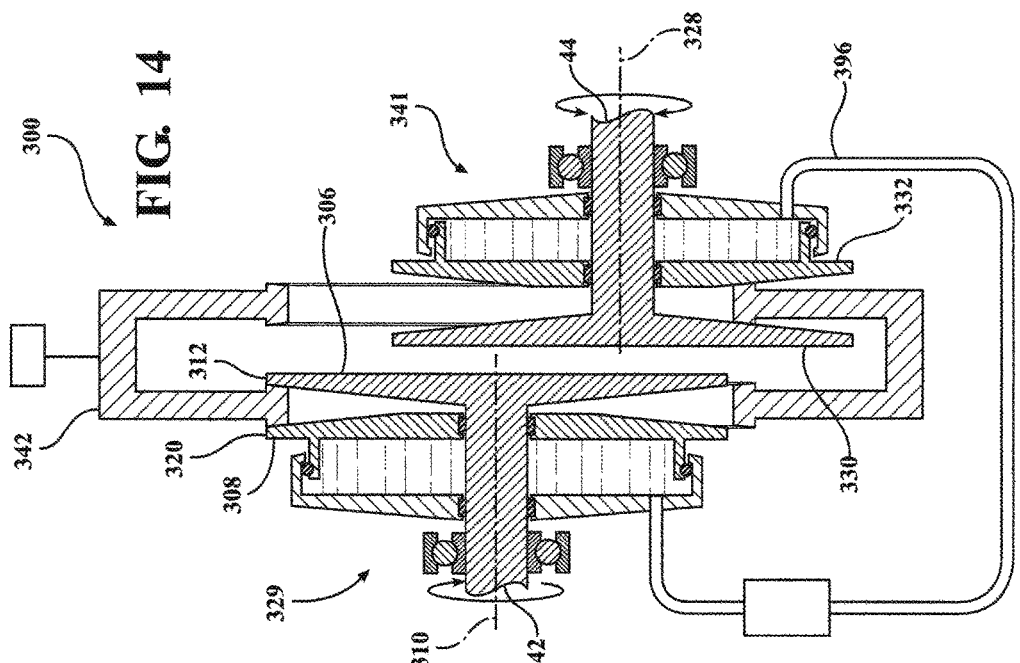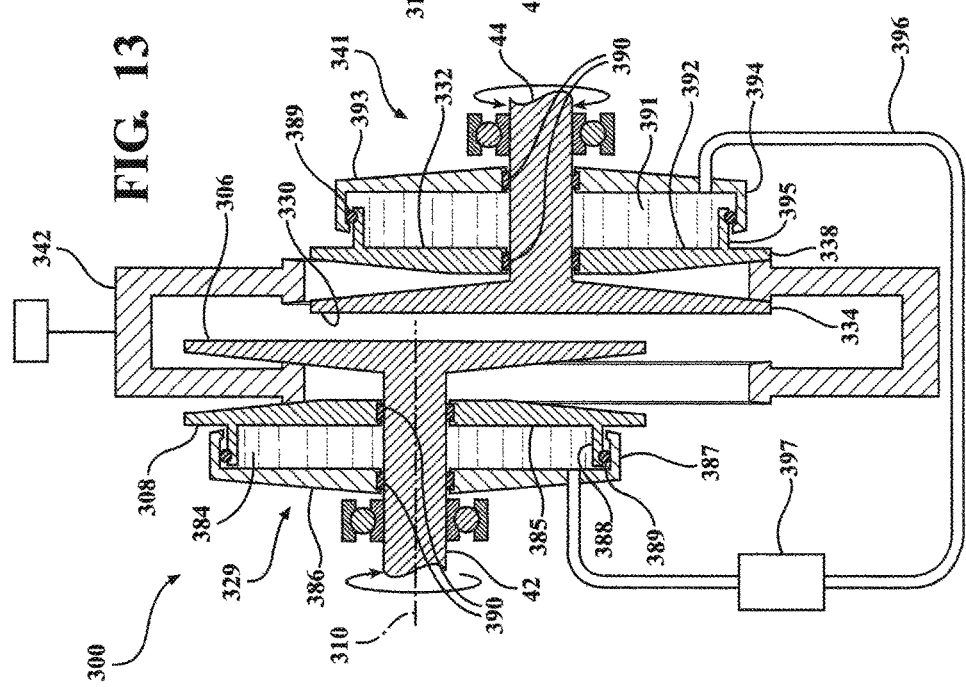

CONTINUOUSLY VARIABLE TRANSMISSION

RELATED APPLICATIONS

This application claims the benefit of U.S. patent application Ser. No. 14/166,336, filed on Jan. 28, 2014, which is herein incorporated by reference in its entirety.

BACKGROUND

A continuously variable transmission (CVT) is a type of transmission capable of providing more useable power, better fuel economy and a smoother driving experience than a traditional manual or automatic transmission. A typical automotive transmission may include a fixed number of gears from which to select. The transmission may employ a gear-set that provides a given number of gear ratios. The transmission shifts gears in an attempt to provide the most appropriate gear ratio for a given situation. Switching into a particular gear may allow the vehicle to produce near maximum power it can with the least amount of energy.

A continuously variable transmission (CVT) is a transmission capable of changing seamlessly through an infinite number of effective gear ratios between maximum and minimum values. A CVT makes it possible to vary progressively the transmission ratio. This contrasts with other mechanical transmissions that offer a fixed number of gear ratios. A CVT may provide better fuel economy than other transmissions, by enabling the engine to run at its most efficient revolutions per minute (RPM) for a range of vehicle power and speed combinations. A CVT may also be used to maximize the performance of a vehicle by allowing the engine to turn at the RPM at which it produces peak power. This is typically higher than the RPM that achieves peak efficiency. A CVT may create a more fuel efficient vehicle. The nearly unlimited number of positions helps ensure it is always using the appropriate amount of power.

SUMMARY

Disclosed herein is a continuously variable transmission that may include an input disk rotatable about a disk axis of rotation. The input disk may include an input disk traction surface. The continuously variable transmission may also include an output disk rotatable about the disk axis of rotation. The output disk may include an output disk traction surface. An input ring member rotatable about an input axis of rotation may include an input ring traction surface located at an input ring traction surface radial distance from the input axis of rotation. The input ring traction surface may engage the input disk traction surface at an input contact patch oriented substantially perpendicular to a first input contact patch vector length extending from the input contact patch to the disk axis of rotation and a second input contact patch vector length extending perpendicular from the input contact patch to the input axis of rotation. An output ring member rotatable about an output axis of rotation may include an output ring traction surface located at an output ring traction surface radial distance from the output axis of rotation. The output ring traction surface may engage the output disk traction surface at an output contact patch oriented substantially perpendicular to a first output contact patch vector length extending perpendicular from the output contact patch to the disk axis of rotation and a second output contact patch vector length extending from the output contact patch to the output axis of rotation. The sum of a length of the first input contact patch vector and a length of the first output contact patch vector is greater than a length of at least one of the second input contact patch vector and the second output contact patch vector.

BRIEF DESCRIPTION OF THE DRAWINGS

The description herein makes reference to the accompanying drawings wherein like reference numerals refer to like parts throughout the several views, and wherein:

FIG. 13 is schematic illustration of a continuously variable transmission employing a hydraulically actuated speed ratio selector, the speed ratio selector arranged in a first speed ratio position;

FIG. 14 is a schematic illustration of the continuously variable transmission of FIG. 13 with the speed ratio selector arranged in a second speed ratio position;

DETAILED DESCRIPTION

Figure 1:
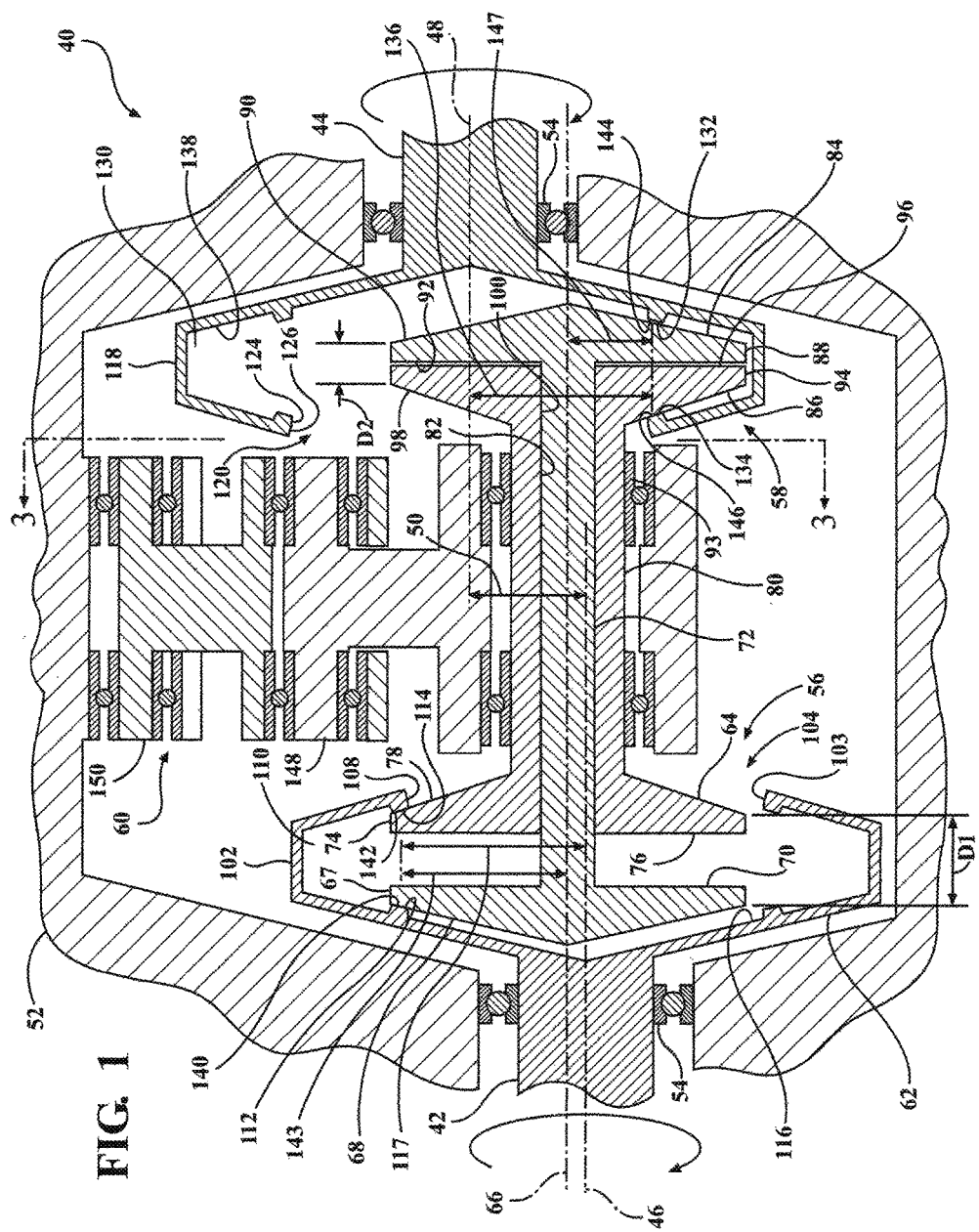
FIG. 1 is a cross-sectional schematic illustration of an exemplary continuously variable transmission with a speed ratio selector arranged in a first speed ratio position.

Referring now to the discussion that follows and also to the drawings, illustrative approaches to the disclosed systems and methods are described in detail. Although the drawings represent some possible approaches, the drawings are not necessarily to scale and certain features may be exaggerated, removed, sectioned out-of-plane or partially sectioned to better illustrate and explain the present invention. Further, the descriptions set forth herein are not intended to be exhaustive or otherwise limit or restrict the claims to the precise forms and configurations shown in the drawings and disclosed in the following detailed description.

With reference to FIG. 1, an exemplary continuously variable transmission 40 operable for transferring rotational energy between an input shaft 42 and an output shaft 44. The input shaft 42 is rotatable about an input axis of rotation 46 and the output shaft 44 is rotatable about an output axis of rotation 48. The input axis of rotation 46 may be arranged substantially parallel to the output axis of rotation 48. The input axis of rotation 46 may be offset from the output axis of rotation 48 by a distance 50. The input and output shafts 42 and 44, respectively, may each be rotatably supported within a housing 52 by bearings 54. The bearings 54 may have any of various configurations, including, but not limited to, a roller bearing, ball bearing and a tapered bearing, and may include other configurations. Multiple bearings 54 and/or bearing types may be used for supporting the input and output shafts 42 and 44. The position and orientation of the input shaft 42 is generally fixed relative to the output shaft 44.

The continuously variable transmission 40 may include an input drive mechanism 56 and an output drive mechanism 58 spaced from the input drive mechanism 56. The input and output drive mechanisms 56 and 58 may be arranged in series. The input and output drive mechanisms 56 and 58, respectively, operate in conjunction with one another to transfer rotational torque from the input shaft 42 to the output shaft 44. The input and output drive mechanisms 56 and 58 may be selectively adjusted to vary a speed ratio (e.g., speed ratio=(rotational speed of output shaft 44)÷(rotational speed of input shaft 42)) of the continuously variable transmission 40. The continuously variable transmission 40 may employ a speed ratio selector 60 operable to selectively adjust the speed ratio.

The input drive mechanism 56 may employ a first input disk 62 and a second input disk 64 positioned adjacent the first input disk 62. The first and second input disks 62 and 64 are each rotatable about a disk axis of rotation 66. The disk axis of rotation 66 may be aligned generally parallel with the input axis of rotation 46 and/or the output axis of rotation 48. The location of the disk axis of rotation 66 may be selectively adjusted relative to the input axis of rotation 46 and/or the output axis of rotation 48 while maintaining the orientation of the disk axis of rotation 66 relative to the input axis of rotation 46 and/or the output axis of rotation 48. In other words, the disk axis of rotation 66 remains substantially parallel to the input axis of rotation 46 and the output axis of rotation 48 when adjusting the position of the disk axis of rotation 66 relative to the input axis of rotation 42 and/or the output axis of rotation 44.

The first and second input disks 62 and 64 extend generally radially outward from the disk axis of rotation 66. An edge 67 defines an outer circumferential perimeter of the first input disk 62. The first input disk 62 may include a generally convex conically-shaped first input disk traction surface 68 positioned adjacent input shaft 42 and an opposite inner surface 70 positioned adjacent the second input disk 64. The inner surface 70 of the first input disk 62 may have generally planar surface contour, as illustrated, for example, in FIG. 1, or may include various other shapes and/or contours. For example, the inner surface 70 may include one or more recessed regions to help minimize weight and/or rotational inertia of the first input disk 62.

The first input disk 62 may be fixedly attached to an inner shaft 72 that extends latterly outward from the inner surface 70 of the first input disk 62. The first input disk 62 may alternatively be integrally formed with the inner shaft 72. A longitudinal axis of the inner shaft 72 substantially coincides with the disk axis of rotation 66.

With continued reference to FIG. 1, an edge 74 defines an outer circumferential perimeter of the second input disk 64. The second input disk 64 may include an inner surface 76 positioned adjacent the first input disk 62 and a generally convex conically-shaped second input disk traction surface 78 located opposite the inner surface 76. The second input disk 64 may be generally configured as a mirror image of the first input disk 62 when viewed from the perspective of FIG. 1. Similar to first input disk 62, the inner surface 76 of the second input disk 64 may have generally planar surface contour, as illustrated, for example, in FIG. 1, or may include various other shapes and/or contours. For example, the inner surface 76 may include one or more recessed regions to help minimize weight and/or rotational inertia of the second input disk 64.

The second input disk 64 may be fixedly attached to a hollow cylindrically-shaped outer shaft 80 that extends latterly outward from the second input disk traction surface 78 of the second input disk 64. The second input disk 64 may alternatively be integrally formed with the outer shaft 80. A longitudinal axis of the outer shaft 80 substantially coincides with the disk axis of rotation 66. The outer shaft 80 includes an elongated outer shaft passage 82 for receiving inner shaft 72. The outer shaft passage 82 extends lengthwise along the disk axis of rotation 66. The inner shaft 72 and outer shaft 80 are moveable axially relative to one another along the disk axis of rotation 66 to enable a distance D1 between the first input disk traction surface 68 and the second input disk traction surface 68 to be selectively varied. The inner shaft 72 and outer shaft 80 may be configured so as to be rotatable relative to one another, or may alternatively be rotatably fixed to one another. The latter may be accomplished, for example, through use of a spline that allows axial movement between the inner and outer shafts 72 and 80, while simultaneously preventing the inner and outer shafts 72 and 80 from rotating relative to one another. Either way, the inner shaft 72 and outer shaft 80 are generally free to move axially relative to one another.

The output drive mechanism 58 may be similarly configured as the input drive mechanism 56, and may include for example, a first output disk 84 and a second output disk 86 positioned adjacent the first output disk 84. The first and second output disks 84 and 86 are each rotatable about the disk axis of rotation 66. The first and second output disks 84 and 86 extend generally radially outward from the disk axis of rotation 66.

An edge 88 defines an outer circumferential perimeter of the first output disk 84. The first output disk 84 may include a generally convex conically-shaped first output disk traction surface 90 arranged adjacent output shaft 44 and an opposite inner surface 92 positioned adjacent the second output disk 86. The inner surface 92 of the first output disk 84 may have generally planar surface contour, as illustrated, for example, in FIG. 1, or may include various other shapes and/or contours. For example, the inner surface 92 may include one or more recessed regions to help minimize weight and/or rotational inertia of the first output disk 84.

The first output disk 84 may be fixedly attached to an end 93 of inner shaft 72 opposite the first input disk 62, causing the first input disk 62 and the first output disk 84 to operably rotate in unison about the disk axis of rotation 66. To facilitate assembly, end 93 of the inner shaft 72 and first output disk 84 may include conjoining threads to enable the first output disk 84 to be threaded onto the inner shaft 72. Other fastening mechanisms may also be used to attach the first output disk 84 to end 83 of the inner shaft 72, such as bolts, rivets, screws, gluing, brazing and welding, to name a few. Alternatively, the first output disk 84 may be integrally formed with the inner shaft 72.

With continued reference to FIG. 1, an edge 94 defines an outer circumferential perimeter of the second output disk 86. The second output disk 86 may include an inner surface 96 positioned adjacent the first output disk 84 and a generally convex conically-shaped second input disk traction surface 98 located opposite the inner surface 96. The second output disk 86 may be generally configured as a mirror image of the first output disk 84 when viewed from the perspective of FIG. 1. Similar to first output disk 84, the inner surface 96 of the second input disk 96 may have generally planar surface contour, as illustrated, for example, in FIG. 1, or may include various other shapes and/or contours. For example, the inner surface 96 may include one or more recessed regions to help minimize weight and/or rotational inertia of the second output disk 86.

The second output disk 86 may be fixedly attached to an end 100 of the outer shaft 80, causing the second input disk 64 and the second output disk 86 to operably rotate in unison about the disk axis of rotation 66. To facilitate assembly, end 100 of the outer shaft 80 and second output disk 86 may include conjoining threads to enable the second output disk 86 to be threaded onto the outer shaft 80. Other fastening mechanisms may also be used to attach the second output disk 86 to end 100 of the outer shaft 80, such as bolts, rivets, screws, gluing, brazing and welding, to name a few. Alternatively, the second output disk 86 may be integrally formed with the outer shaft 80.

Similar to first input disk 62 and second input disk 64, the first output disk 84 and the second output disk 86 are moveable axially relative to one another along the disk axis or rotation 66. This enables a distance D2 between the first output disk traction surface 90 and the second output disk traction surface 98 to be selectively varied.

The input drive mechanism 56 may include an input ring member 102 fixedly connected to the input shaft 42 for concurrent rotation therewith. The input ring member 102 operates to rotatably couple the first and second input disks 62 and 64 to the input shaft 42. The position and orientation of the input ring member 102 remains substantially fixed relative to the input shaft 42. The input ring member 102 may have a generally C-shaped configuration with an open end 104 arranged opposite a closed end 106. The closed end 106 may be fixedly attached to or integrally formed with the input shaft 42. A generally circular opening 103 in the open end 104 of the input ring member 102 is defined by a circumferential edge 108.

The first and second input disks 62 and 64 may be positioned within an interior cavity 110 of the input ring member 102, with the corresponding inner and outer shafts 72 and 80 extending through the opening 103 in the input ring member 102. The opening 103 may be sized larger than the first and second input disks 62 and 64 to facilitate positioning of the disks within the interior cavity 110 of the input ring member 102.

The input ring member 102 may include an input ring first traction surface 112 engageable with the first input disk traction surface 68 of the first input disk 62, and an input ring second traction surface 114 engageable with the second input disk traction surface 78. The input ring first and second traction surfaces 112 and 114 may be configured as continuous rings extending inward from an inner surface 116 of the input ring member 102. The input ring first and second traction surfaces 112 and 114 may be located at a radius 117 from the input axis of rotation 46. The input ring second traction surface 114 may be arranged immediately adjacent the opening 103 in the input ring member 102. The input ring first traction surface may be located opposite the input ring second traction surface 114 along a side of the input ring member 102 attached to the input shaft 42.

The output drive mechanism 58 may include an output ring member 118 fixedly connected to the output shaft 44 for concurrent rotation therewith. The output ring member 118 operates to rotatably couple the first and second output disks 84 and 86 to the output shaft 44. The position and orientation of the output ring member 118 remains substantially fixed relative to the output shaft 44. The output ring member 118 may have a generally C-shaped configuration with an open end 120 arranged opposite a closed end 122. The closed end 122 may be fixedly attached to or integrally formed with the output shaft 44. A generally circular opening 124 in the open end 120 of the output ring member 118 is defined by a circumferential edge 126.

The first and second output disks 84 and 86 may be positioned within an interior cavity 130 of the output ring member 118, with the corresponding inner and outer shafts 72 and 80 extending through the opening 124 in the output ring member 118. The opening 124 may be sized larger than the first and second output disks 84 and 86 to facilitate positioning of the disks within the interior cavity 130 of the output ring member 118.

The output ring member 118 may include an output ring first traction surface 132 engageable with the first output disk traction surface 90 of the first output disk 84, and an output ring second traction surface 134 engageable with the second output disk traction surface 98. The output ring first and second traction surfaces 132 and 134 may be configured as a continuous ring extending generally inward from an inner surface 138 of the output ring member 118. The output ring first and second traction surfaces 132 and 134 may be located at a radius 136 from the output axis of rotation 48.

The output ring second traction surface 134 may be arranged immediately adjacent the opening 124 in the output ring member 118. The output ring first traction surface 132 may be located opposite the output ring second traction surface 134 along a side of the output ring member 118 attached to the output shaft 44.

The continuously variable transmission 40 operates to transfer torque from the input shaft 42 to the output shaft 44. Torque from the input shaft 42 may be transmitted from the input ring member 102 to the first input disk 62 across a first input contact patch 140 where the input ring first traction surface 112 engages the first input disk traction surface 78, and to the second input disk 64 across a second input contact patch 142 where the input ring second traction surface 114 engages the second input disk traction surface 78. The first and second input contact patches 140 and 142 are located at a radius 143 from the disk axis of rotation 66. The radius 143 of the first and second input contact patches 140 and 142 varies as the speed ratio of the continuously variable transmission 40 is varied. The inner shaft 72 transfers torque from the first input disk 62 to the first output disk 84. The outer shaft 80 transfers torque from the second input disk 64 to the second output disk 86. Torque may be transferred from the first output disk 84 to the output ring member 118 across a first output contact patch 144 where the output ring first traction surface 132 engages the first output disk traction surface 90. Torque may be transferred from the second output disk 86 to the output ring member 118 across a second output contact patch 146 where the output ring second traction surface 134 engages the second output disk traction surface 134. The first and second output contact patches 144 and 146 are located at a radius 147 from the disk axis of rotation 66. It should be noted that for purposes of discussion the first and second contact patches 144 and 146 are illustrated as occurring within a common plane, so as to be arranged on diametrically opposite sides of disk axis of rotation 66 (i.e., approximately 180 degrees apart). In practice, however, first and second contact patches 144 and 146 may be located out-of-plane, such that the angular location of the first and second contact patches relative to one another is something other than 180 degrees. The radius 147 of the first and second output contact patches 144 and 146 varies as the speed ratio of the continuously variable transmission 40 is varied. The output ring member 118 operates to transfer torque from the first and second output disks 84 and 86 to the output shaft 44.

The speed ratio of the continuously variable transmission 40 is a function of the radial location 143 of the first and second input contact patches 140 and 142, and the radial location 147 of the first and second output contact patches 144 and 146. The speed ratio of the continuously variable transmission 40 is partially determined by the radial location at which the input ring first and second traction surfaces 112 and 114 engage the first and second input disk traction surfaces 68 and 78, respectively (i.e., the radial location 143 of the first and second input contact patches 140 and 142). The rotational speed of the output shaft 44 decreases, relative to the rotational speed of the input shaft 42, as the radial location 143 of the first and second input contact patches 140 and 142 increases. On the other hand, the rotational speed of the output shaft 44 increases as the radial location 143 of the first and second input contact patches 140 and 142 decreases. The radial location at which the output ring first and second traction surfaces 132 and 134 engage the first and second output disk traction surfaces 90 and 98, respectively (i.e., the radial location 147 of the first and second output contact patches 144 and 146) has the opposite effect. The rotational speed of the output shaft 44 increases, relative to the rotational speed of the input shaft 42, as the radial location 147 of the first and second output contact patches 144 and 146 increases. On the other hand, the rotational speed of the output shaft 44 decreases as the radial location 147 of the first and second output contact patches 144 and 146 decreases.

The speed ratio may be selectively adjusted by moving the location of the disk axis of rotation 66 relative to the input axis of rotation 46 and the output axis of rotation 48, which effects the radial location 143 at which the input ring member 102 engages the first and second input disks 62 and 64, and the radial location 147 at which the output ring member 118 engages the first and second output disks 84 and 86. Since the first input disk 46 is connected to the first output disk 84 by way of inner shaft 72, and the second input disk 64 is connected to the second output disk 86 by way of outer shaft 80, any movement of the first and second input disks 62 and 64 results in corresponding movement of the first and second output disks 84 and 86. For example, moving the first and second input disks 62 and 64 radially upward (as viewed from the perspective of FIG. 1) also moves the first and second output disks radially upward. On the other hand, moving the first and second input disks 62 and 64 radially downward (as viewed from the perspective of FIG. 1) also moves the first and second output disks radially downward.

Figure 2:
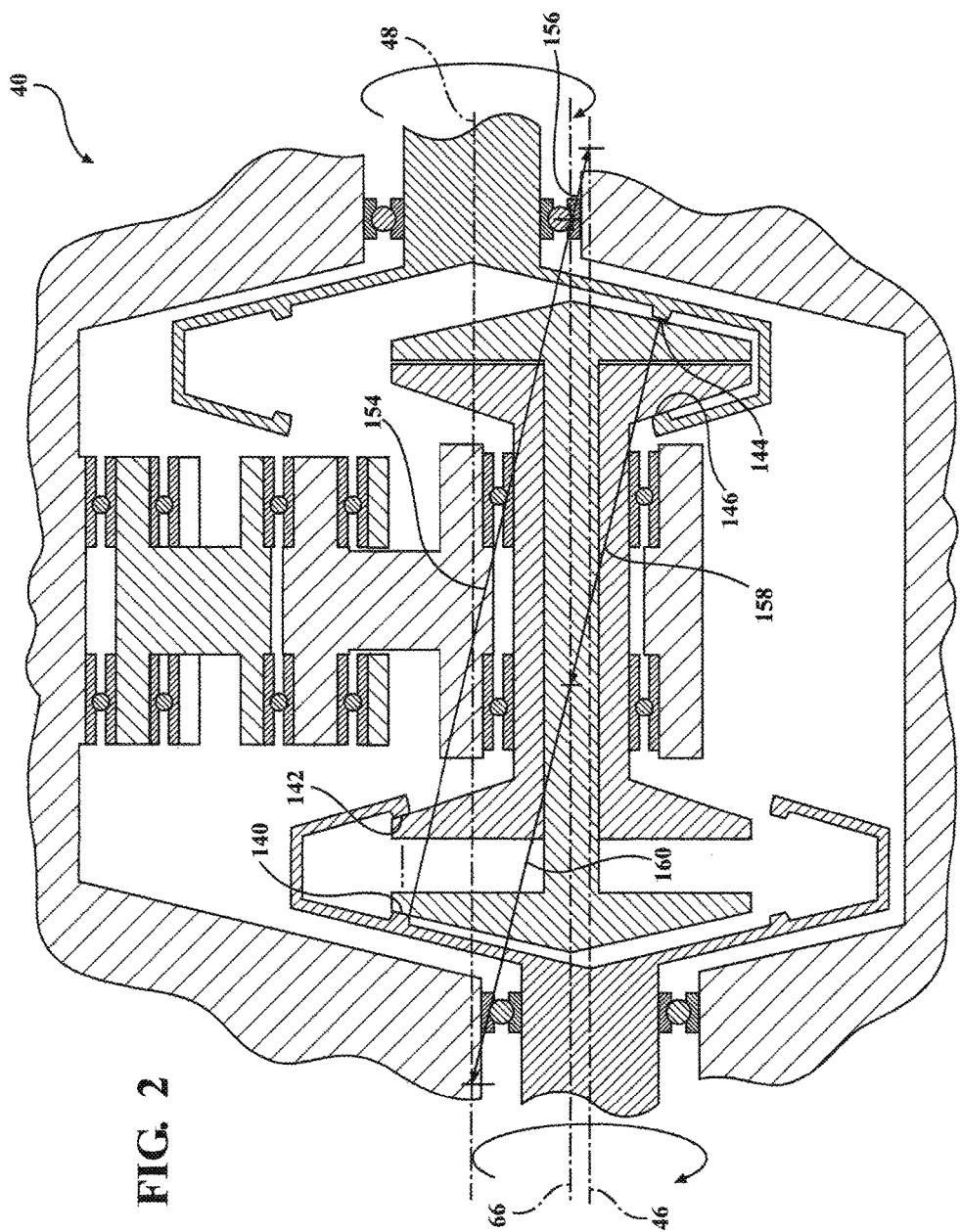
FIG. 2 is a cross-sectional view of the continuously variable transmission of FIG. 1 showing a location and orientation of various contact patch vectors.

With reference to FIG. 2, the first input contact patch 140 is aligned substantially perpendicular to a first input contact patch vector 154 extending from the first input contact patch 140 to the disk axis of rotation 66, and aligned substantially perpendicular to a second input contact patch vector length 156 extending from the first input contact patch 140 to the input axis of rotation 46. Similarly, the first output contact patch 146 is aligned substantially perpendicular to a first output contact patch vector 158 extending from the first output contact patch 146 to the disk axis of rotation 66, and aligned substantially perpendicular to a second output contact patch vector 160 extending from the first output contact patch 146 to the output axis of rotation 48. The configuration and arrangement of the various components of the continuously variable transmission 40 is such that a sum of a length of the first input contact patch vector 154 and a length of the first output contact patch vector 158 is greater than a length of the second input contact patch vector 156 and a length of the second output contact patch vector 160. The following relationship holds true for all speed ratios:

((length of first input contact patch vector 154)+
(length of first output contact patch vector 158))
>(length of second input contact patch vector
156); and     A.

((length of first input contact patch vector 154)+
(length of first output contact patch vector 158))
>(length of second output contact patch vector
160)     B.

A similar relationship also holds true for the second input contact patch 142 and the second output contact patch 144. For example, a sum of a length of a first input contact patch vector extending from the second input contact patch 142 to the disk axis of rotation 66 and aligned substantially perpendicular to the second input contact patch 142, and a length of a first output contact patch vector extending from the second output contact patch 146 to the disk axis of rotation 66 and aligned substantially perpendicular to the second output contact patch 146 is greater than at least one of a length of a second input contact patch vector extending from the second input contact patch 142 to the input axis of rotation 46 and aligned substantially perpendicular to the second output contact patch 142, and a length of a second output contact patch vector extending from the second output contact patch 146 to the output axis of rotation 48 and aligned substantially perpendicular to the second output contact patch 146.

With reference to FIGS. 1 and 3-5, the speed ratio selector 60 may be used to selectively adjust the speed ratio of the continuously variable transmission 40. The speed ratio selector 60 may have any of a wide variety of configurations. The speed ratio selector 60 may employ any device capable of adjusting a location of the first and second input disks 62 and 64 relative to the input ring 102 and the first and second output disks 84 and 86 relative to the output ring 118. This may be accomplished, for example, by selectively adjusting the location of the disk axis of rotation 66 relative to the input axis of rotation 46 and/or the output axis of rotation 48. An example of one possible configuration of the speed ratio selector 60 is illustrated in the drawing figures. The speed ratio selector 60 may include, for example, a pair of interconnected links operably connecting the outer shaft 80, and correspondingly, the inner shaft 72, the first and second input disks 62 and 64, and the first and second output disks 84 and 86, to the housing 52. The speed ratio selector 60 operates to vary the location of the disk axis of rotation 66 relative to the input axis of rotation 46 and output axis of rotation 48, and thus the speed ratio. The speed ratio selector 60 may include a first link 148 pivotally attached to the outer shaft 80 and a second link 150 pivotally attached to the first link 148 and the housing 52. The speed ratio selector 60 may employ one or more bearings 152 located at the pivot points of the speed ratio selector 60. The speed ratio may be varied by alternately collapsing and extending the first and second links 148 and 150, which varies a distance between the disk axis of rotation 66 and the housing 52, and correspondingly, the location of the disk axis of rotation 66 relative to the input axis of rotation 46 and the output axis of rotation 48.

Figure 3:
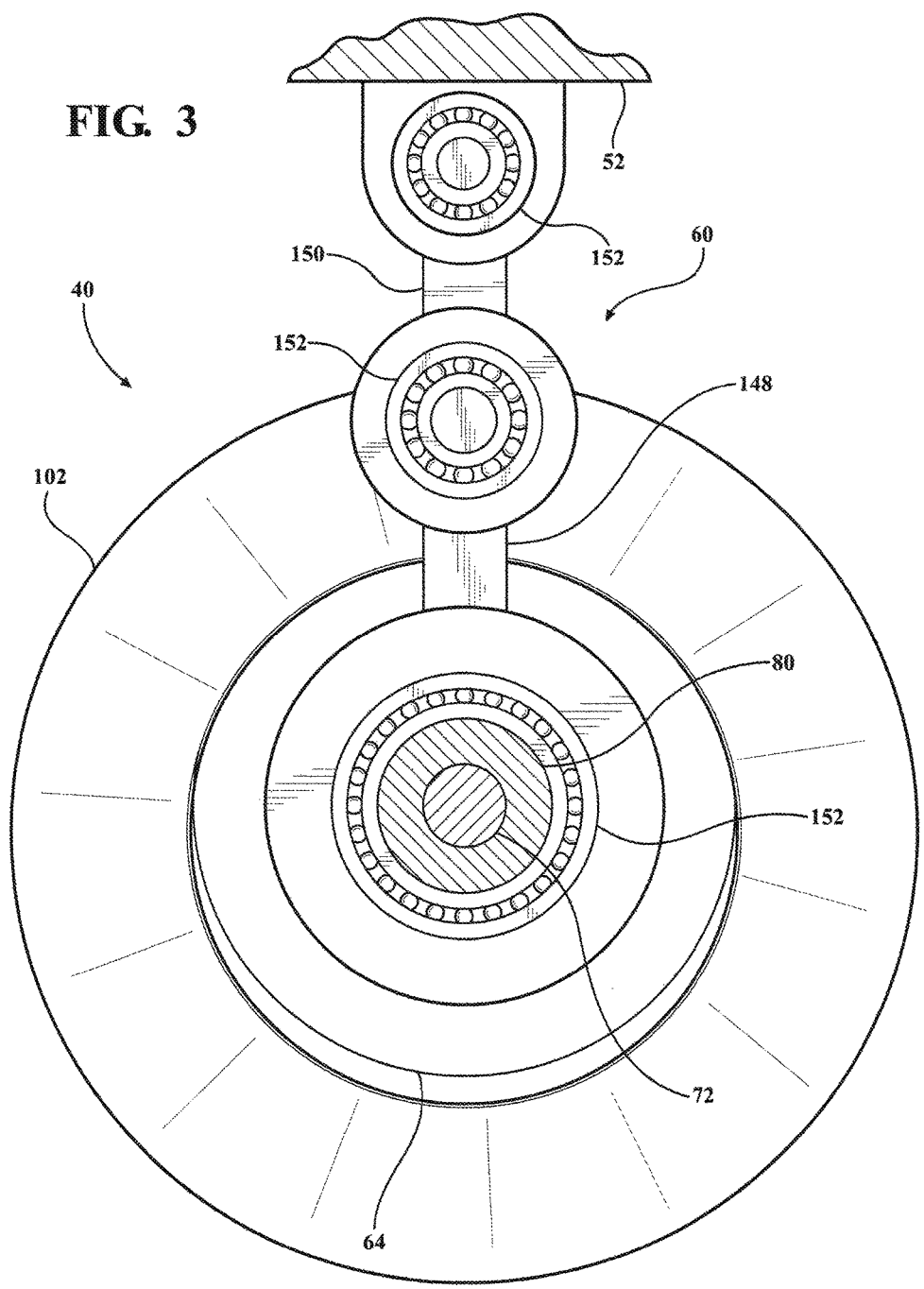
FIG. 3 is a partial cross-sectional view of the continuously variable transmission of FIG. 1 taken along section line 3-3, with the speed ratio selector arranged in the first speed ratio position.

FIGS. 1 and 3 illustrate the speed ratio selector 60 arranged in a first speed ratio position, in which the first and second links 148 and 150 are fully extended. In this position the input ring member 102 engages the first and second input disks 62 and 64 near their respective outer edges 67 and 74, and the output ring member 118 engages the first and second output disks 84 and 86 closer toward the disk axis of rotation 66. This arrangement produces the lowest speed ratio (e.g., speed ratio=(rotational speed of output shaft 44)÷(rotational speed of input shaft 42)), wherein the output shaft 44 has a lower rotational speed than the input shaft 42.

Figure 4:
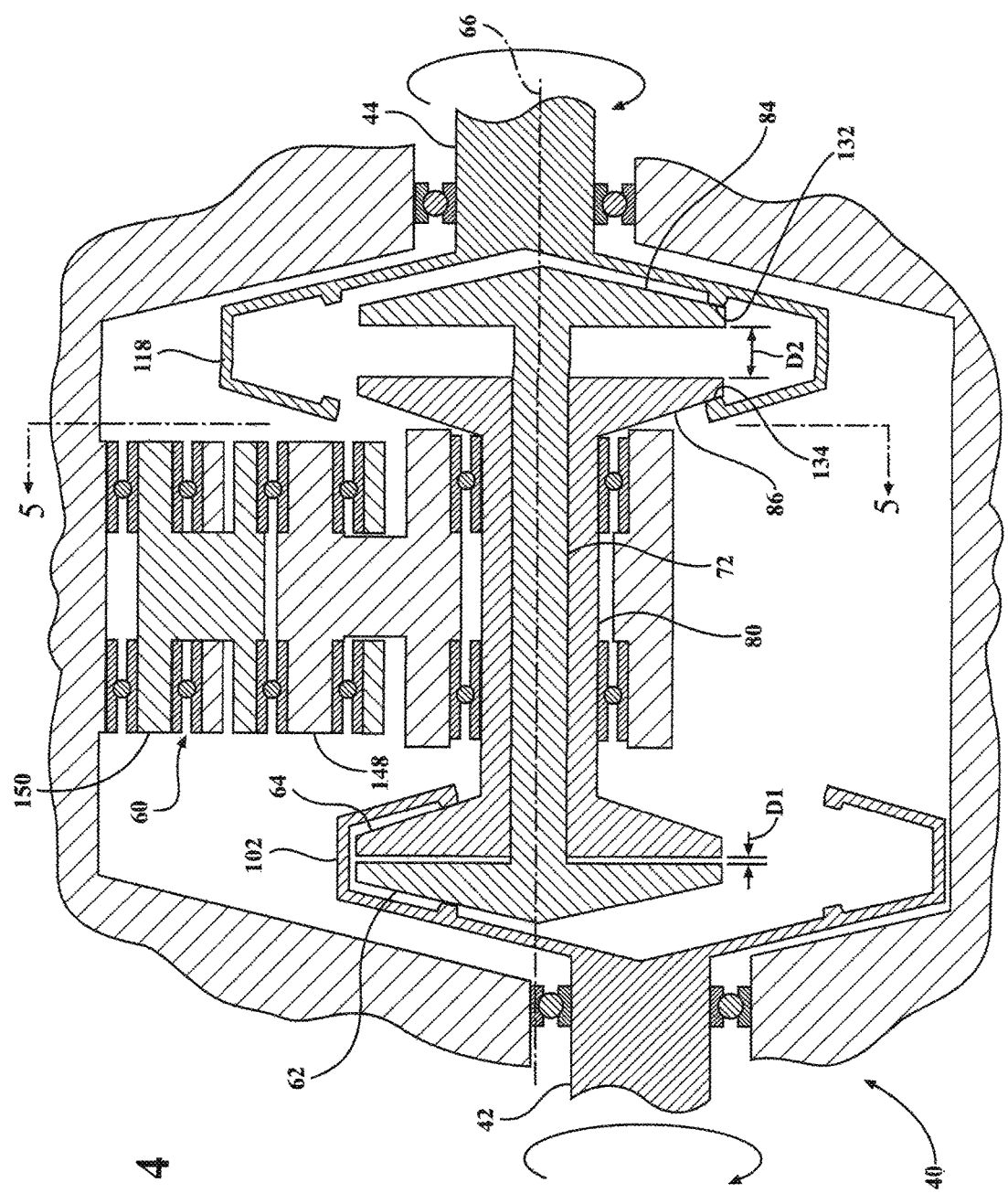
FIG. 4 is a schematic illustration of the continuously variable transmission of FIG. 1 with the speed ratio selector arranged in a second speed ratio position.
Figure 5:
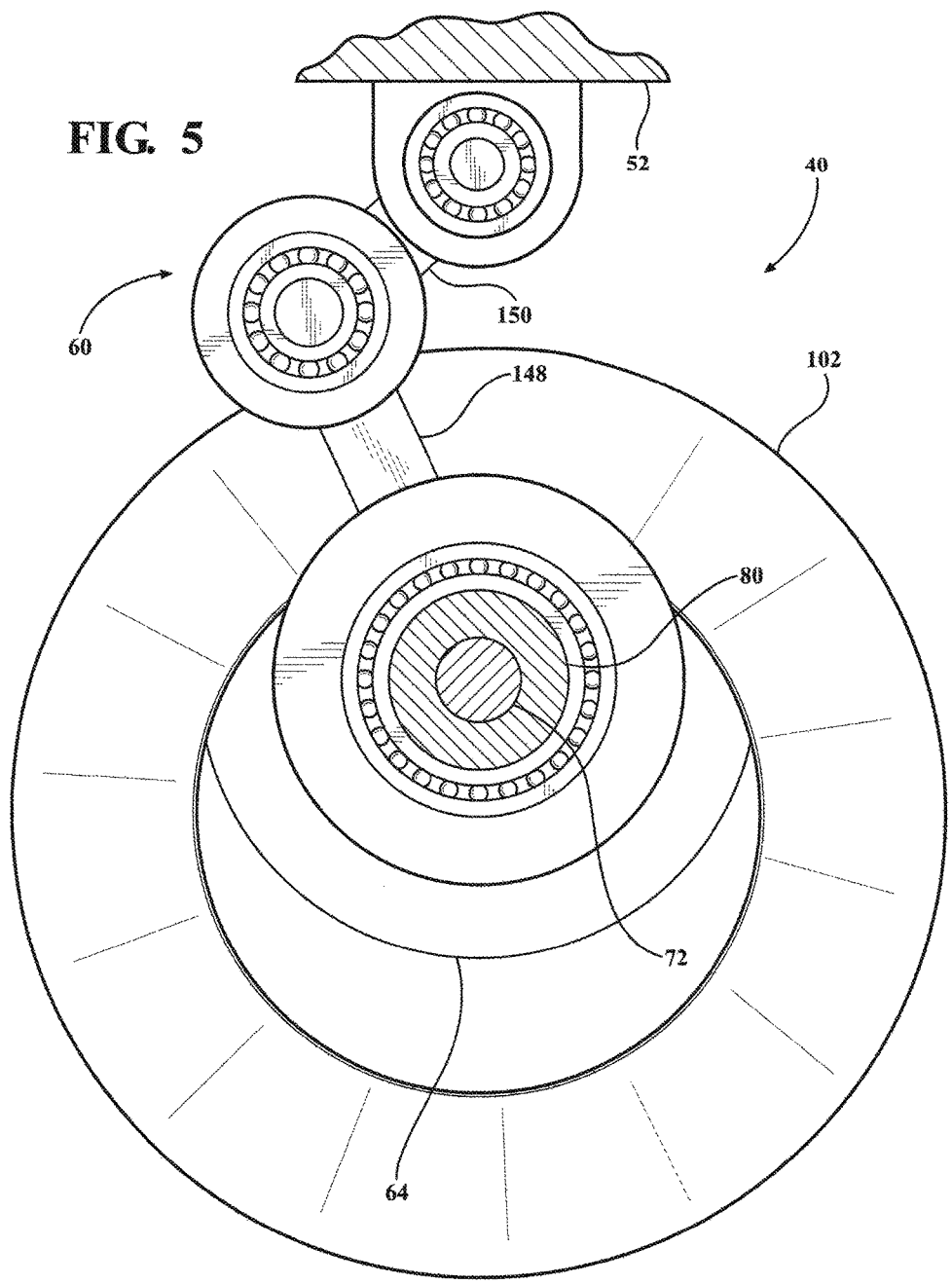
FIG. 5 is a partial cross-sectional view of the continuously variable transmission of FIG. 4 taken along section line 5-5, with the speed ratio selector arranged in the second speed ratio position.

FIGS. 4 and 5 illustrate the speed ratio selector 60 arranged in a second speed ratio position, in which the first and second links 148 and 150 are fully collapsed. In this position the output ring member 118 engages the first and second output disks 84 and 86 near their respective outer edges 88 and 94, and the input ring member 102 engages the first and second input disks 62 and 64 closer toward the disk axis of rotation 66. This arrangement produces the highest speed ratio, wherein the output shaft 44 has a lower rotational speed than the input shaft 42. The speed ratio selector 60 may be infinitely adjustable between the first speed ratio position (for example, as illustrated in FIGS. 1 and 3) and the second speed ratio position (for example, as illustrated in FIGS. 4 and 5).

The speed ratio selector 60 illustrated in the drawing figures is merely one example of the various types and configuration of actuators that may be used to selectively adjust the speed ratio of the continuously variable transmission. Other types and configurations of actuating mechanisms may also be employed. For example, the speed ratio selector 60 may include electro-mechanical, hydraulic, pneumatic and mechanical actuators, as well as combinations thereof. Other mechanisms capable of selectively adjusting the radial location of the first and second input disks 62 and 64 relative to the input ring member 102, and the radial location of the first and second output disks 84 and 86 relative to the output ring member 118, may also be employed for selectively adjusting the speed ratio of the continuously variable transmission 40.

Figure 6:
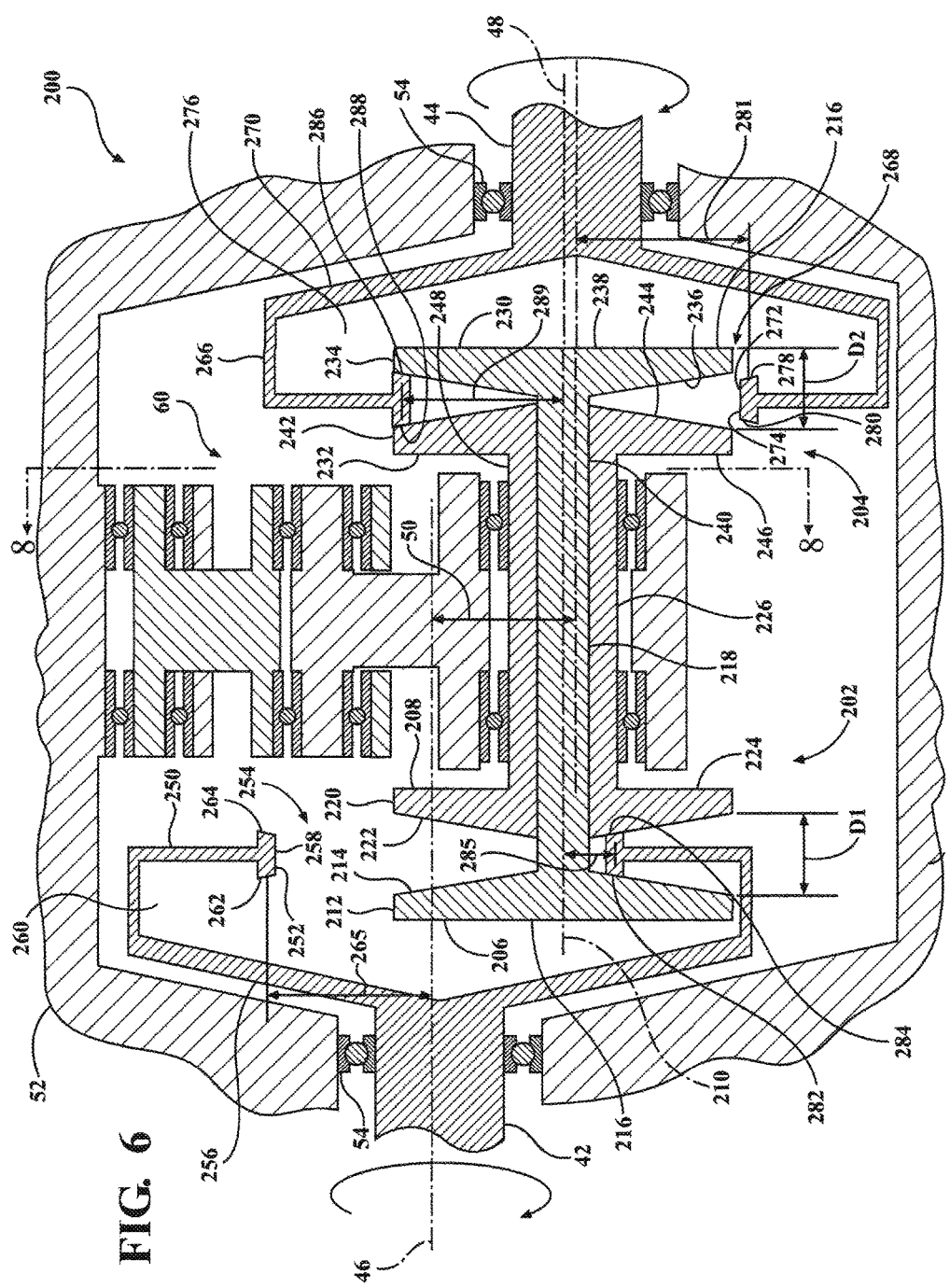
FIG. 6 is a schematic illustration of an alternately configured continuously variable transmission with a speed ratio selector arranged in a first speed ratio position.

With reference to FIG. 6, an alternately configured continuously variable transmission 200 operable for transferring rotational energy between the input shaft 42 and the output shaft 44. The input shaft 42 is rotatable about the input axis of rotation 46 and the output shaft 44 is rotatable about an output axis of rotation 48. The input axis of rotation 46 may be arranged substantially parallel to the output axis of rotation 48. The input axis of rotation 46 may be offset from the output axis of rotation 48 by the distance 50. The input and output shafts 42 and 44, respectively, may each be rotatably supported within the housing 52 by bearings 54. The position and orientation of the input shaft 42 is generally fixed relative to the output shaft 44. The offset distance 50 may be used to compensate for variation in working fluid viscosity.

The continuously variable transmission 200 may include an input drive mechanism 202 and an output drive mechanism 204 spaced from the input drive mechanism 202. The input and output drive mechanisms 202 and 204, respectively, operate in conjunction with one another to transfer rotational torque from the input shaft 42 to the output shaft 44. The input and output drive mechanisms 202 and 204 may be arranged in series. The input and output drive mechanisms 202 and 204 may be selectively adjusted to vary the speed ratio (e.g., speed ratio=(rotational speed of output shaft 44)÷(rotational speed of input shaft 42)) of the continuously variable transmission 200. The continuously variable transmission 200 may employ the speed ratio selector 60 operable to selectively adjust the speed ratio.

The input drive mechanism 202 may employ a first input disk 206 and a second input disk 208 positioned adjacent the first input disk 206. The first and second input disks 206 and 208 are each rotatable about a disk axis of rotation 210. The disk axis of rotation 210 may be aligned generally parallel with the input axis of rotation 46 and/or the output axis of rotation 48. The location of the disk axis of rotation 210 may be selectively adjusted relative to the input axis of rotation 46 and/or the output axis of rotation 48 while maintaining the orientation of the disk axis of rotation 210 relative to the input axis of rotation 46 and/or the output axis of rotation 48. In other words, the disk axis of rotation 210 remains substantially parallel to the input axis of rotation 46 and the output axis of rotation 48 when adjusting the position of the disk axis of rotation 210 relative to the input axis of rotation 42 and/or the output axis of rotation 44.

The first and second input disks 206 and 208 extend generally radially outward from the disk axis of rotation 210. An edge 212 defines an outer circumferential perimeter of the first input disk 206. The first input disk 206 may include a generally convex conically-shaped first input disk traction surface 214 positioned opposite the input shaft 42 and adjacent the second input disk 208. Opposite the input disk traction surface 214 is an outer surface 216 positioned adjacent the input shaft 42. The outer surface 216 of the first input disk 206 may have generally planar surface contour, as illustrated, for example, in FIG. 6, or may include various other shapes and/or contours. For example, the inner surface 216 may include one or more recessed regions to help minimize weight and/or rotational inertia of the first input disk 206.

The first input disk 206 may be fixedly attached to an inner shaft 218 that extends laterally outward from the first input disk traction surface 214 of the first input disk 206. The first input disk 206 may alternatively be integrally formed with the inner shaft 218. A longitudinal axis of the inner shaft 218 substantially coincides with the disk axis of rotation 210.

With continued reference to FIG. 6, an edge 220 defines an outer circumferential perimeter of the second input disk 208. The second input disk 208 may include a generally convex conically-shaped second input disk traction surface 222 positioned adjacent the first input disk 206 and an outer surface 224 located opposite the second input disk traction surface 222. The second input disk 208 may be generally configured as a mirror image of the first input disk 206 when viewed from the perspective of FIG. 6. Similar to first input disk 206, the outer surface 224 of the second input disk 208 may have generally planar surface contour, as illustrated, for example, in FIG. 6, or may include various other shapes and/or contours. For example, the outer surface 224 may include one or more recessed regions to help minimize weight and/or rotational inertia of the second input disk 208.

The second input disk 208 may be fixedly attached to a hollow cylindrically-shaped outer shaft 226 that extends latterly outward from the outer surface 224 of the second input disk 208. The second input disk 208 may alternatively be integrally formed with the outer shaft 226. A longitudinal axis of the outer shaft 226 substantially coincides with the disk axis of rotation 210. The outer shaft 226 includes an elongated outer shaft passage 228 for receiving inner shaft 218. The outer shaft passage 226 extends lengthwise along the disk axis of rotation 210. The inner shaft 218 and outer shaft 226 are moveable axially relative to one another along the disk axis of rotation 210 to enable a distance D1 between the first input disk traction surface 214 and the second input disk traction surface 22 to be selectively varied. The inner shaft 218 and outer shaft 226 may be configured so as to be rotatable relative to one another, or may alternatively be rotatably fixed to one another. The latter may be accomplished, for example, through use of a spline that allows axial movement of the inner and outer shafts 218 and 226 relative to one another, while simultaneously preventing the inner and outer shafts 218 and 226 from rotating relative to one another. Either way, the inner shaft 218 and outer shaft 226 are generally free to move axially relative to one another.

The output drive mechanism 204 may be similarly configured as the input drive mechanism 202, and may include for example, a first output disk 230 and a second output disk 232 positioned adjacent the first output disk 230. The first and second output disks 230 and 232 are each rotatable about the disk axis of rotation 210. The first and second output disks 230 and 232 extend generally radially outward from the disk axis of rotation 210.

An edge 234 defines an outer circumferential perimeter of the first output disk 230. The first output disk 230 may include a generally convex conically-shaped first output disk traction surface 236 arranged opposite the output shaft 44 and an adjacent the second output disk 232. An outer surface 238 of the first output disk 230 may have a generally planar surface contour, as illustrated, for example, in FIG. 6, or may include various other shapes and/or contours. For example, the outer surface 238 may include one or more recessed regions to help minimize weight and/or rotational inertia of the first output disk 230.

The first output disk 230 may be fixedly attached to an end 240 of inner shaft 218 opposite the first input disk 206, causing the first input disk 206 and the first output disk 230 to operably rotate in unison about the disk axis of rotation 210. To facilitate assembly, end 240 of the inner shaft 218 and the first output disk 230 may include conjoining threads to enable the first output disk 230 to be threaded onto the inner shaft 218. Other fastening mechanisms may also be used to attach the first output disk 230 to end 240 of the inner shaft 218, such as bolts, rivets, screws, gluing, brazing and welding, to name a few. Alternatively, the first output disk 230 may be integrally formed with the inner shaft 218.

With continued reference to FIG. 6, an edge 242 defines an outer circumferential perimeter of the second output disk 232. The second output disk 232 may include a generally convex conically-shaped second input disk traction surface 244 positioned adjacent the first output disk 230 and located opposite an outer surface 246. The second output disk 232 may be generally configured as a mirror image of the first output disk 230 when viewed from the perspective of FIG. 6. Similar to the first output disk 230, the outer surface 246 of the second input disk 232 may have generally planar surface contour, as illustrated, for example, in FIG. 6, or may include various other shapes and/or contours. For example, the outer surface 246 may include one or more recessed regions to help minimize weight and/or rotational inertia of the second output disk 232.

The second output disk 232 may be fixedly attached to an end 248 of the outer shaft 226, causing the second input disk 208 and the second output disk 232 to operably rotate in unison about the disk axis of rotation 210. To facilitate assembly, end 248 of the outer shaft 226 and the second output disk 232 may include conjoining threads to enable the second output disk 232 to be threaded onto the outer shaft 226. Other fastening mechanisms may also be used to attach the second output disk 232 to end 248 of the outer shaft 226, such as bolts, rivets, screws, gluing, brazing and welding, to name a few. Alternatively, the second output disk 232 may be integrally formed with the outer shaft 226.

Similar to first input disk 206 and second input disk 208, the first output disk 230 and the second output disk 232 are moveable axially relative to one another along the disk axis or rotation 210. This enables a distance D2 between the first output disk traction surface 236 and the second output disk traction surface 244 to be selectively varied.

The input drive mechanism 202 may include an input ring member 250 fixedly connected to the input shaft 42 for concurrent rotation therewith. The input ring member 250 operates to rotatably couple the first and second input disks 206 and 208 to the input shaft 42. The position and orientation of the input ring member 250 remains substantially fixed relative to the input shaft 42. The input ring member 250 may have a generally C-shaped configuration with an open end 254 arranged opposite a closed end 256. The closed end 256 may be fixedly attached to or integrally formed with the input shaft 42. A generally circular opening 252 in the open end 254 of the input ring member 250 is defined by a circumferential edge 258.

The first input disk 206 may be positioned within an interior cavity 260 of the input ring member 250, with the inner shaft 218 extending through the opening 252 in the input ring member 250. The opening 252 may be sized larger than the first input disk 206 to facilitate positioning of the disk within the interior cavity 260 of the input ring member 250. The second input disk 208 may be positioned outside of the input ring member 250 adjacent the opening 252.

The input ring member 250 may include an input ring first traction surface 262 engageable with the first input disk traction surface 214 of the first input disk 206, and an input ring second traction surface 264 engageable with the second input disk traction surface 222. The input ring first and second traction surfaces 262 and 264 may be configured as a continuous ring. The input ring first and second traction surfaces 262 and 264 may be located at a radius 265 from the input axis of rotation 46. The input ring first and second traction surfaces 262 and 264 may be arranged immediately adjacent the opening 252 in the input ring member 250. The input ring first and second traction surfaces 262 and 264 generally face in opposite directions, with the first input ring traction surface 262 extending generally inward toward the interior cavity 260 and the second input traction surface 264 extending generally outward and away from the interior cavity 260.

The output drive mechanism 204 may include an output ring member 266 fixedly connected to the output shaft 44 for concurrent rotation therewith. The output ring member 266 operates to rotatably couple the first and second output disks 230 and 232 to the output shaft 44. The position and orientation of the output ring member 266 remains substantially fixed relative to the output shaft 44. The output ring member 266 may have a generally C-shaped configuration with an open end 268 arranged opposite a closed end 270. The closed end 270 may be fixedly attached to or integrally formed with the output shaft 44. A generally circular opening 272 in the open end 270 of the output ring member 266 is defined by a circumferential edge 274.

The first output disk 230 may be positioned within an interior cavity 276 of the output ring member 266, with the inner shaft 218 extending through the opening 268 in the output ring member 266. The opening 268 may be sized larger than the first output disk 230 to facilitate positioning of the disk within the interior cavity 276 of the output ring member 266. The second output disk 232 may be positioned outside of the output ring member 266 adjacent the opening 268.

The output ring member 266 may include an output ring first traction surface 278 engageable with the first output disk traction surface 236 of the first output disk 230, and an output ring second traction surface 280 engageable with the second output disk traction surface 244. The output ring first and second traction surfaces 278 and 280 may be configured as a continuous ring. The output ring first and second traction surfaces 278 and 280 may be located at a radius 281 from the input axis of rotation 46. The output ring first and second traction surfaces 278 and 280 may be arranged immediately adjacent the opening 268 in the output ring member 266. The output ring first and second traction surfaces 278 and 280 generally face in opposite directions, with the first output ring traction surface 278 extending generally inward toward the interior cavity 276 and the second output traction surface 280 extending generally outward and away from the interior cavity 276.

With reference to FIG. 6, the continuously variable transmission 200 operates to transfer torque from the input shaft 42 to the output shaft 44. Torque from the input shaft 42 may be transmitted from the input ring member 250 to the first input disk 206 across a first input contact patch 282 where the input ring first traction surface 262 engages the first input disk traction surface 214, and to the second input disk 208 across a second input contact patch 284 where the input ring second traction surface 264 engages the second input disk traction surface 222. The first and second input contact patches 282 and 284 are located at a radius 285 from the disk axis of rotation 210. The radius 285 of the first and second input contact patches 282 and 284 varies as the speed ratio of the continuously variable transmission 200 is varied. The inner shaft 218 transfers torque from the first input disk 206 to the first output disk 230. The outer shaft 226 transfers torque from the second input disk 208 to the second output disk 232. Torque may be transferred from the first output disk 230 to the output ring member 266 across a first output contact patch 286 where the output ring first traction surface 278 engages the first output disk traction surface 236. Torque may be transferred from the second output disk 232 to the output ring member 266 across a second output contact patch 288 where the output ring second traction surface 280 engages the second output disk traction surface 244. The first and second output contact patches 286 and 288 are located at a radius 289 from the disk axis of rotation 210. The radius 289 of the first and second output contact patches 286 and 288 varies as the speed ratio of the continuously variable transmission 200 is varied. The output ring member 266 operates to transfer torque from the first and second output disks 230 and 232 to the output shaft 44.

The speed ratio of the continuously variable transmission 200 is a function of the radial location 285 of the first and second input contact patches 282 and 284, and the radial location 289 of the first and second output contact patches 286 and 288. The speed ratio of the continuously variable transmission 200 is partially determined by the radial location at which the input ring first and second traction surfaces 262 and 264 engage the first and second input disk traction surfaces 214 and 222, respectively (i.e., the radial location 285 of the first and second input contact patches 282 and 284). The rotational speed of the output shaft 44 decreases, relative to the rotational speed of the input shaft 42, as the radial location 285 of the first and second input contact patches 282 and 284 increases. On the other hand, the rotational speed of the output shaft 44 increases as the radial location 285 of the first and second input contact patches 282 and 284 decreases. The radial location at which the output ring first and second traction surfaces 278 and 280 engage the first and second output disk traction surfaces 236 and 244, respectively (i.e., the radial location 289 of the first and second output contact patches 286 and 288) has the opposite effect. The rotational speed of the output shaft 44 increases, relative to the rotational speed of the input shaft 42, as the radial location 289 of the first and second output contact patches 286 and 288 decreases. On the other hand, the rotational speed of the output shaft 44 decreases as the radial location 289 of the first and second output contact patches 286 and 288 increases.

The speed ratio may be selectively adjusted by moving the location of the disk axis of rotation 210 relative to the input axis of rotation 46 and/or the output axis of rotation 48, which effects the radial location 285 at which the input ring member 250 engages the first and second input disks 206 and 208, and the radial location 289 at which the output ring member 266 engages the first and second output disks 230 and 232. Since the first input disk 206 is connected to the first output disk 230 by way of inner shaft 218, and the second input disk 208 is connected to the second output disk 232 by way of outer shaft 226, any movement of the first and second input disks 206 and 208 results in corresponding movement of the first and second output disks 230 and 232. For example, moving the first and second input disks 206 and 208 radially upward (as viewed from the perspective of FIG. 6) also moves the first and second output disks 230 and 232 radially upward. On the other hand, moving the first and second input disks 206 and 208 radially downward (as viewed from the perspective of FIG. 6) also moves the first and second output disks 230 and 232 radially downward.

Figure 7:
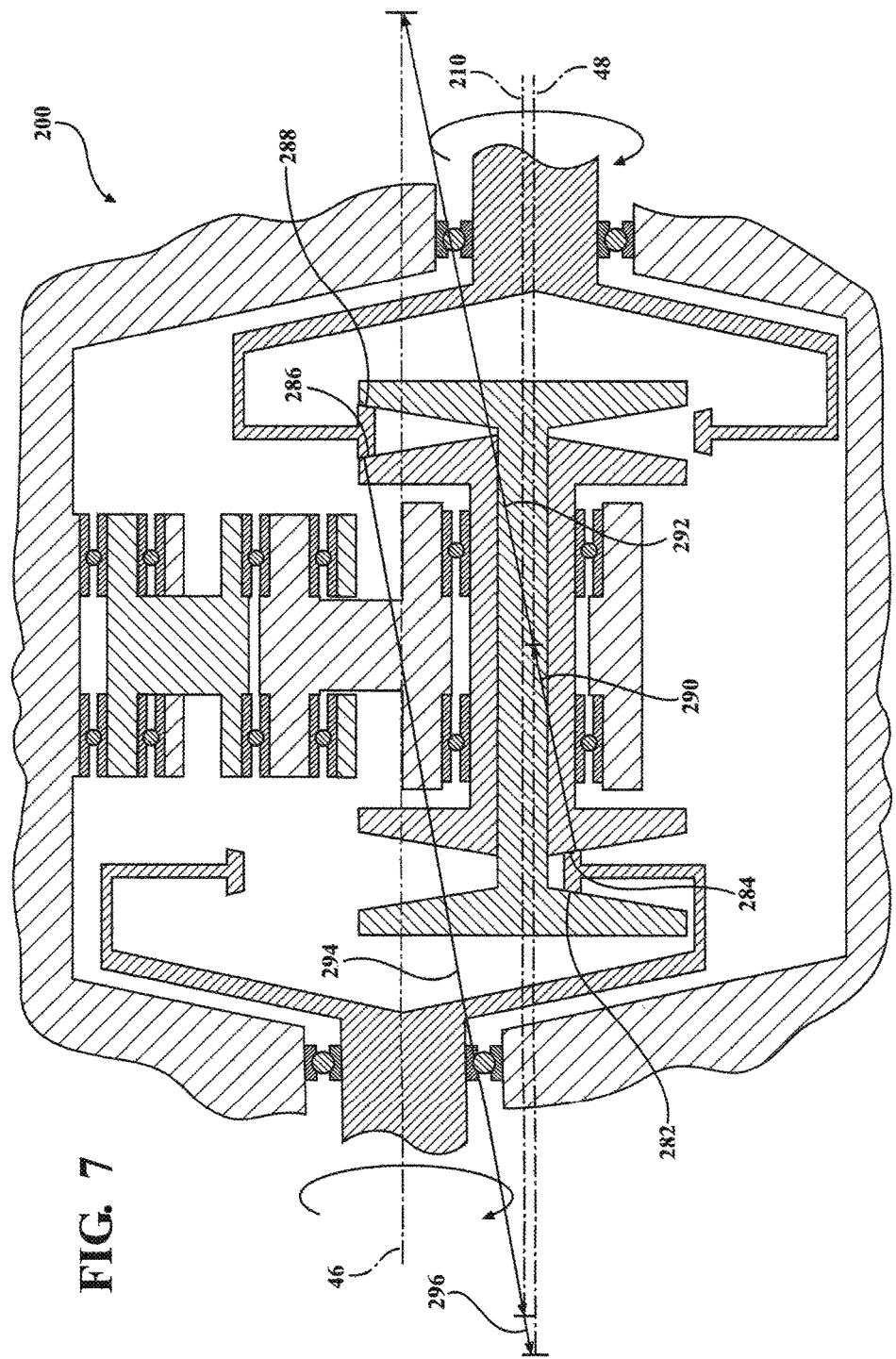
FIG. 7 is a cross-sectional view of the continuously variable transmission of FIG. 6 showing a location and orientation of various contact patch vectors.

With reference to FIG. 7, the second input contact patch 284 is aligned substantially perpendicular to a first input contact patch vector 290 extending from the second input contact patch 284 to the disk axis of rotation 210, and aligned substantially perpendicular to a second input contact patch vector 292 extending from the second input contact patch 284 to the input axis of rotation 46. Similarly, the second output contact patch 286 is aligned substantially perpendicular to a first output contact patch vector 294 extending from the first output contact patch 286 to the disk axis of rotation 210, and aligned substantially perpendicular to a second output contact patch vector 296 extending from the second output contact patch 286 to the output axis of rotation 48. The configuration and arrangement of the various components of the continuously variable transmission 200 is such that a sum of a length of the first input contact patch vector 290 and a length of the first output contact patch vector 294 is greater than a length of the second input contact patch vector 292 and a length of the second output contact patch vector 296. The following relationship holds true for all speed ratios:

((length of first input contact patch vector 290)+ (length of first output contact patch vector 294)) >(length of second input contact patch vector 292); and     A.

((length of first input contact patch vector 290)+ (length of first output contact patch vector 294)) >(length of second output contact patch vector 296)     B.

A similar relationship also holds true for the first input contact patch 282 and the first output contact patch 288. For example, a sum of a length of a first input contact patch vector length extending from the first input contact patch 282 to the disk axis of rotation 210 and aligned substantially perpendicular to the first input contact patch 282, and a length of a first output contact patch vector length extending from the first output contact patch 288 to the disk axis of rotation 66 and aligned substantially perpendicular to the first output contact patch 288 is greater than at least one of a length of a second input contact patch vector length extending from the first input contact patch 282 to the input axis of rotation 46 and aligned substantially perpendicular to the first input contact patch 282, and a length of a second output contact patch vector length extending from the first output contact patch 288 to the output axis of rotation 48 and aligned substantially perpendicular to the first output contact patch 288.

Figure 8:
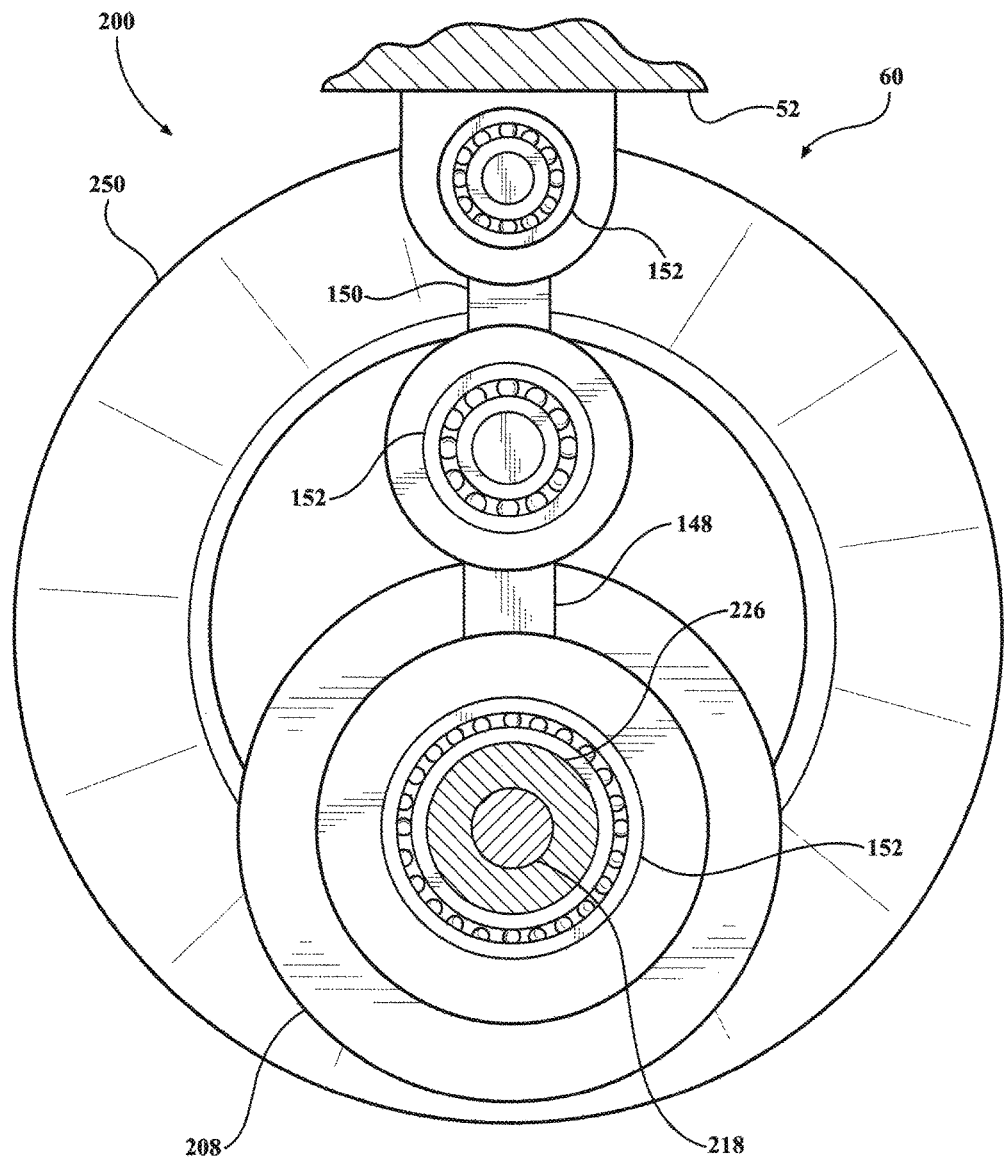
FIG. 8 is a partial cross-sectional view of the continuously variable transmission of FIG. 6 taken along section line 8-8, with the speed ratio selector arranged in the first speed ratio position.

The speed ratio selector 60 may be used to selectively adjust the speed ratio of the continuously variable transmission 200. The speed ratio selector 60 may be configured as previously described in connection with FIGS. 1 and 3-5. FIGS. 6 and 8 illustrate the speed ratio selector 60 arranged in a second speed ratio position, in which the first and second links 148 and 150 are fully extended. In this position the input ring member 250 engages the first and second input disks 206 and 208 near their respective outer edges 212 and 220, and the output ring member 266 engages the first and second output disks 230 and 232 closer toward the disk axis of rotation 210. This arrangement produces the highest speed ratio (e.g., speed ratio=(rotational speed of output shaft 44)÷(rotational speed of input shaft 42)), wherein the output shaft 44 has a higher rotational speed than the input shaft 42.

Figure 9:
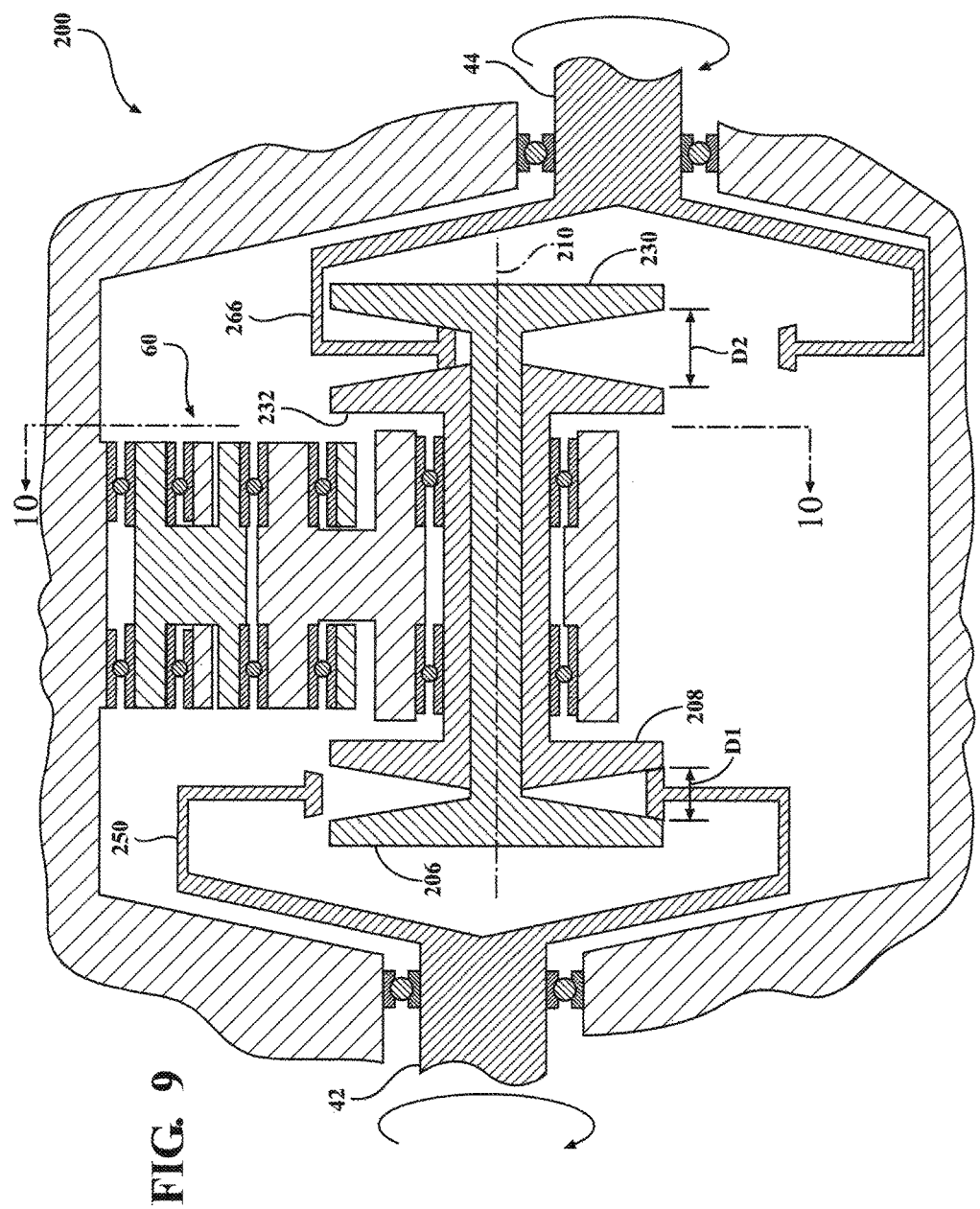
FIG. 9 is a schematic illustration of the continuously variable transmission of FIG. 6 with the speed ratio selector arranged in a second speed ratio position.
Figure 10:
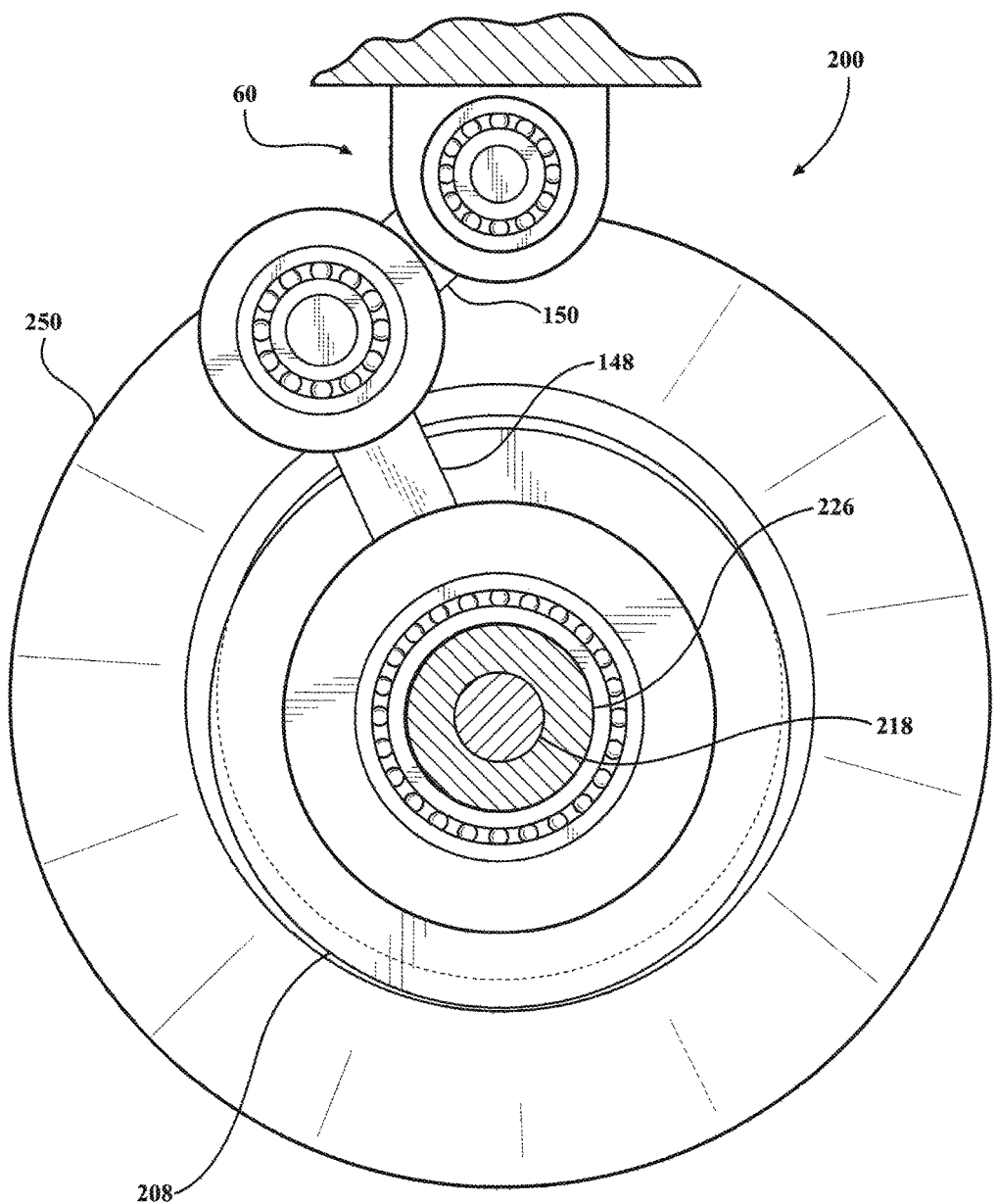
FIG. 10 is a partial cross-sectional view of the continuously variable transmission of FIG. 9 taken along section line 10-10, with the speed ratio selector arranged in the second speed ratio position.

FIGS. 9 and 10 illustrate the speed ratio selector 60 arranged in a first speed ratio position, in which the first and second links 148 and 150 are fully collapsed. In this position the output ring member 266 engages the first and second output disks 230 and 232 near their respective outer edges 234 and 242, and the input ring member 250 engages the first and second input disks 206 and 208 closer toward the disk axis of rotation 210. This arrangement produces the lowest speed ratio, wherein the output shaft 44 has a lower rotational speed than the input shaft 42. The speed ratio selector 60 may be infinitely adjustable between the first speed ratio position (for example, as illustrated in FIGS. 6 and 8) and the second speed ratio position (for example, as illustrated in FIGS. 9 and 10).

Figures 11, 12:
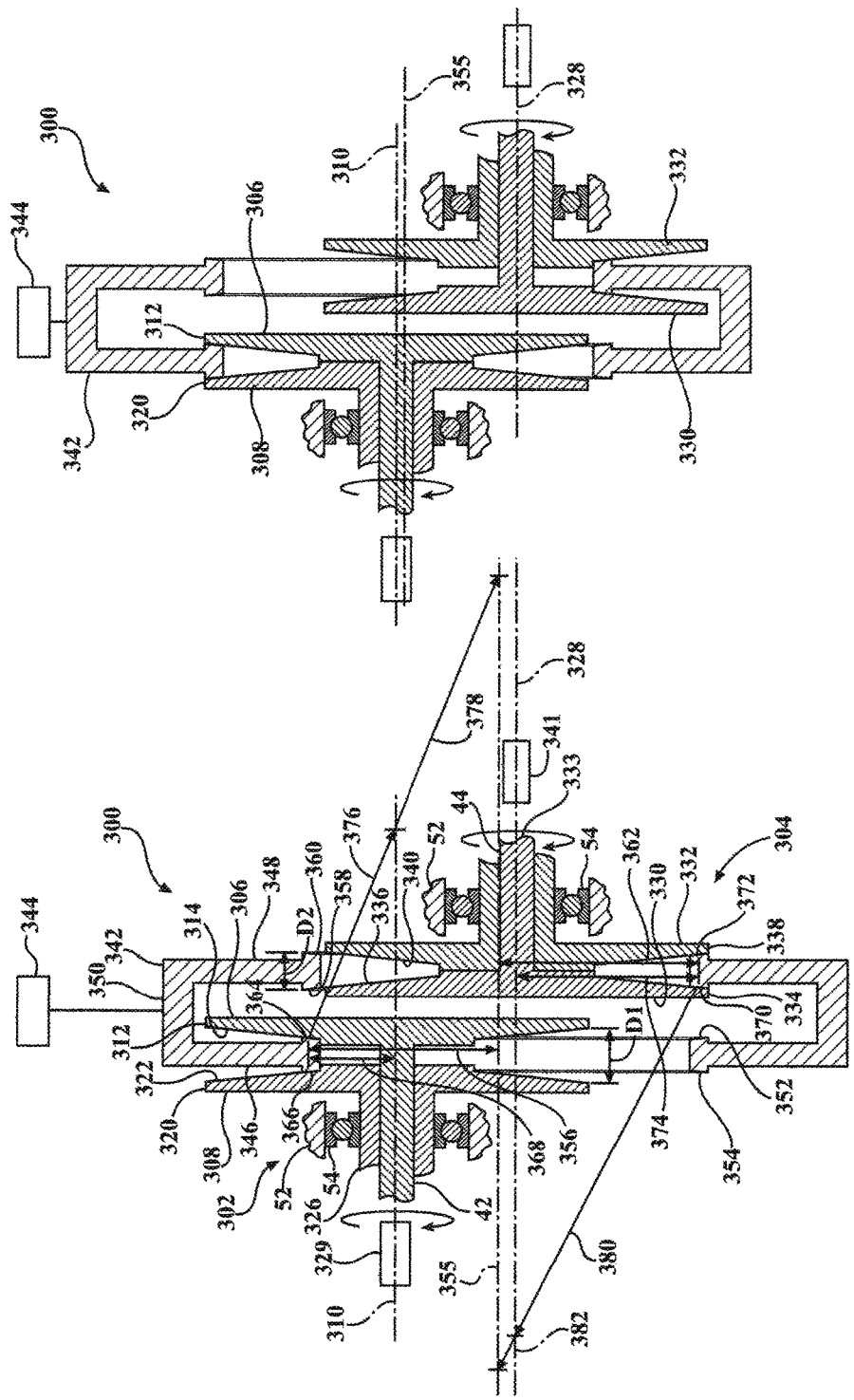
FIG. 11 is a schematic illustration of continuously variable transmission employing a single ring member operably connecting an input drive member to an output drive member, the ring member arranged in a first speed ratio position.
FIG. 12 is a schematic illustration of the continuously variable transmission of FIG. 11, with the ring member arranged in a second speed ratio position.

With reference to FIG. 11, an alternately configured continuously variable transmission 300 operable for transferring rotational energy between the input shaft 42 and the output shaft 44. The input shaft 42 is rotatable about the input axis of rotation 46 and the output shaft 44 is rotatable about an output axis of rotation 48. The input axis of rotation 46 may be arranged substantially parallel to the output axis of rotation 48. The position and orientation of the input shaft 42 is generally fixed relative to the output shaft 44.

The continuously variable transmission 300 may include an input drive mechanism 302 and an output drive mechanism 304 spaced from the input drive mechanism 302. The input and output drive mechanisms 302 and 304 may be arranged in series. The input and output drive mechanisms 302 and 304, respectively, operate in conjunction with one another to transfer rotational torque from the input shaft 42 to the output shaft 44.

The input drive mechanism 302 may employ a first input disk 306 and a second input disk 308 positioned adjacent the first input disk 306. The first input disk 306 may be fixedly attached to the input shaft 42. The second input disk 308 may be fixedly attached to a hollow cylindrically-shaped input outer shaft 326 that extends laterally outward from the second input disk 308. The first and second input disks 306 and 308 are each rotatable about an input disk axis of rotation 310. The input disk axis of rotation 310 substantially coincides with a longitudinal axis of the input shaft 42 and the input outer shaft 326. The input shaft 42 and the input outer shaft 326 may be rotatably supported within the housing 52 by one or more bearings 54.

The first and second input disks 306 and 308 extend generally radially outward from the input disk axis of rotation 310. An edge 312 defines an outer circumferential perimeter of the first input disk 306. The first input disk 306 may include a generally convex conically-shaped first input disk traction surface 314 positioned adjacent the second input disk 308. An edge 320 defines an outer circumferential perimeter of the second input disk 308. The second input disk 308 may include a generally convex conically-shaped second input disk traction surface 322 positioned adjacent the first input disk 306. The second input disk 308 may be generally configured as a mirror image of the first input disk 306 when viewed from the perspective of FIG. 11.

The axial location of the input outer shaft 326 and the second input disk 308 may be axially fixed relative to the housing 52. The input shaft 42 and the first input disk 306 may be moveable axially along the input disk axis of rotation 310 relative to the second input disk 306 to enable the distance D1 between the first input disk traction surface 314 and the second input disk traction surface 322 to be selectively varied. Alternatively, the axially location of the input shaft 42 and the first input disk 306 may be axially fixed relative to the input outer shaft 326 and the second input disk 308, and the input outer shaft 326 and the second input disk 308 may be moveable axially along the input disk axis of rotation 310 relative to the input shaft 42 and the first input disk 306.

An input biasing mechanism 329 may be operably connected to the input shaft 42. The input biasing mechanism 329 operates to urge the first input disk 306 toward the second input disk 308. Various biasing mechanisms may be employed, which may include for example, a spring, such as a coil spring, and various hydraulic, mechanical, electromechanical devices capable of generating a biasing force.

The input shaft 42 and input outer shaft 326 may be configured so as to be rotatable relative to one another, or alternatively rotatably fixed to one another. The latter may be accomplished, for example, by employing a spline that enables axial movement of the input shaft 42 and the input outer shaft 326 relative to one another, while simultaneously preventing the input shaft 42 and input outer shaft 326 from rotating relative to one another. Either way, the input shaft 42 and input outer shaft 326 are generally free to move axially relative to one another.

The output drive mechanism 304 may be similarly configured as the input drive mechanism 302, and may include for example, a first output disk 330 and a second output disk 332 positioned adjacent the first output disk 330. The first and second output disks 330 and 332 are each rotatable about an output disk axis of rotation 328. The first output disk 330 may be fixedly attached to the output shaft 44. The second output disk 332 may be fixedly attached to a hollow cylindrically-shaped output outer shaft 333 that extends latterly outward from the second output disk 332. The output disk axis of rotation 328 substantially coincides with a longitudinal axis of the output shaft 44 and the output outer shaft 333. The output shaft 44 and the output outer shaft 333 may be rotatably supported within the housing 52 by one or more bearings 54.

The first and second output disks 330 and 332 extend generally radially outward from the output disk axis of rotation 328. An edge 334 defines an outer circumferential perimeter of the first output disk 330. The first output disk 330 may include a generally convex conically-shaped first output disk traction surface 336 arranged adjacent the second output disk 332. An edge 338 defines an outer circumferential perimeter of the second output disk 332. The second output disk 332 may include a generally convex conically-shaped second output disk traction surface 340 positioned adjacent the first input disk 330. The second output disk 332 may be generally configured as a mirror image of the first output disk 330 when viewed from the perspective of FIG. 11.

An axial location of the second output disk 332 may be substantially fixed relative to the housing 52. The output shaft 44 may be moveable axially along the output disk axis of rotation 328 relative to the output outer shaft 333 and the first output disk 330 to enable the distance D2 between the first output disk traction surface 336 and the second output disk traction surface 340 to be selectively varied. Alternatively, the axially location of the output shaft 44 may be axially fixed relative to the housing 52, and the output outer shaft 333 and second output disk 332 may be moveable axially along the output disk axis of rotation 328 relative to the output shaft 44 and the first output disk 330.

An output biasing mechanism 341 may be operably connected to the output shaft 44. The output biasing mechanism 341 operates to urge the first output disk 330 toward the second output disk 332. Various biasing mechanisms may be employed, which may include for example, a spring, such as a coil, and various hydraulic, mechanical, electromechanical devices capable of generating a biasing force.

The output shaft 44 and output outer shaft 333 may be configured so as to be rotatable relative to one another, or alternatively rotatably fixed to one another. The latter may be accomplished, for example, by employing a spline that permits axial movement of the output shaft 44 and the input outer shaft 333 relative to one another, while simultaneously preventing the output shaft 44 and output outer shaft 333 from rotating relative to one another. Either way, the output shaft 44 and output outer shaft 333 are generally free to move axially relative to one another.

The continuously variable drive mechanism 300 may include a ring member 342 operably connecting the input drive mechanism 302 to the output drive mechanism 304. The ring member 342 may be moved radially relative to the input drive mechanism 302 and the output drive mechanism 304. The radial location of the ring member 342 may be selectively adjusted relative to the input and output drive mechanisms 302 and 304 to vary the speed ratio (e.g., speed ratio=(rotational speed of output shaft 44)÷(rotational speed of input shaft 42)) of the continuously variable transmission 300.

A speed ratio selector 344 may be operably connected to the ring member 342 to selectively adjust the speed ratio of the continuously variable transmission 300. The speed ratio selector 344 operates to adjust the radial location of the ring member 342 relative to the input and output drive mechanisms 302 and 304 to achieve a selected speed ratio. The speed ratio selector 344 may have any of a wide variety of configurations. The speed ratio selector 344 may employ any device capable of adjusting a location of the ring member 342 relative to the first and second input disks 306 and 308 of the input drive mechanism 302, and the first and second output disks 330 and 332 of the output drive mechanism 304.

The ring member 342 may include a pair of interconnected co-rotating rings. The co-rotating rings may include an input traction ring 346 that engages the first and second input disks 306 and 308, and an output traction ring 348 that engages the first and second output disks 330 and 332. A generally cylindrical-shaped connecting ring 350 may fixedly connect the input traction ring 346 to the output traction ring 348. The input and output traction rings 346 and 348 may be arranged substantially perpendicular to the input and output disk access of rotation 328 and 310.

The input traction ring 346 may include a first traction surface 352 engageable with the first input disk traction surface 314 of the first input disk 306, and a second traction surface 354 engageable with the second input disk traction surface 308. The input traction ring first and second traction surfaces 352 and 354 may be configured as a continuous ring. The input traction ring first and second traction surfaces 352 and 354 may be located at a radius 356 from a ring member axis of rotation 355. The input traction ring first and second traction surfaces 352 and 354 are arranged on opposite sides of the input traction ring 346, with the first traction surface 352 facing the first input disk 306 and the second traction surface 354 facing the second input disk 308.

The output traction ring 348 may include a first traction surface 358 engageable with the first output disk traction surface 336 of the first output disk 330, and a second traction surface 360 engageable with the second output disk traction surface 340. The output traction ring first and second traction surfaces 358 and 360 may be configured as a continuous ring. The output traction ring first and second traction surfaces 358 and 360 may be located at a radius 362 from the ring member axis of rotation 355. The output traction ring first and second traction surfaces 358 and 360 are arranged on opposite sides of the output traction ring 348, with the first traction surface 358 facing the first output disk 330 and the second traction surface 360 facing the second output disk 332.

The continuously variable transmission 300 operates to transfer torque from the input shaft 42 to the output shaft 44. Torque from the input shaft 42 may be transferred from the first input disk 306 to the ring member 342 across a first input contact patch 364 where the input traction ring first traction surface 352 engages the first input disk traction surface 314. For configurations in which the input shaft 42 is rotatably fixed to the input outer shaft 326, for example, by means of spline, torque from the input shaft 42 may be transferred to the ring member 342 across a second input contact patch 366 where the input traction ring second traction surface 354 engages the second input disk traction surface 322. The first and second input contact patches 364 and 366 are located at a radius 368 from the input disk axis of rotation 310. The radius 368 of the first and second input contact patches 364 and 366 varies as the speed ratio of the continuously variable transmission 300 is varied.

The ring member 342 transfers torque from the input drive mechanism 302 to the output drive mechanism 304. Torque may be transferred from the ring member 342 to the first output disk 330 across a first output contact patch 370 where the output traction ring first traction surface 358 engages the first output disk traction surface 336. Torque may be transferred from the ring member 342 to the second output disk 332 across a second output contact patch 372 where the output traction ring second traction surface 360 engages the second output disk traction surface 340. The first and second output contact patches 370 and 372 are located at a radius 374 from the output disk axis of rotation 328. The radius 374 of the first and second output contact patches 370 and 372 varies as the speed ratio of the continuously variable transmission 300 is varied. Torque transferred from the ring member 342 to first output disk 330 may be output through the output outer shaft 333.

For configurations in which the output shaft 44 is rotatably fixed to the output outer shaft 333, for example, by means of spline, torque from the output outer shaft 333 may be transferred across the connection between the two shafts to the output shaft 44. Alternatively, torque from the output shaft 44 may be transferred across the connection between the two shafts to the output outer shaft 333.

The speed ratio of the continuously variable transmission 300 is a function of the radial location 368 of the first and second input contact patches 364 and 366, and the radial location 374 of the first and second output contact patches 370 and 372. The speed ratio of the continuously variable transmission 300 is partially determined by the radial location at which the input traction ring first and second traction surfaces 352 and 354 engage the first and second input disk traction surfaces 314 and 322, respectively (i.e., the radial location 368 of the first and second input contact patches 364 and 366). The rotational speed of the output shaft 44 increases, relative to the rotational speed of the input shaft 42, as the radial location 368 of the first and second input contact patches 364 and 366 increases. On the other hand, the rotational speed of the output shaft 44 decreases as the radial location 368 of the first and second input contact patches 364 and 366 decreases. The radial location at which the output traction ring first and second traction surfaces 370 and 372 engage the first and second output disk traction surfaces 336 and 340, respectively (i.e., the radial location 374 of the first and second output contact patches 370 and 372) has the opposite effect. The rotational speed of the output shaft 44 increases, relative to the rotational speed of the input shaft 42, as the radial location 374 of the first and second output contact patches 370 and 372 decreases. On the other hand, the rotational speed of the output shaft 44 decreases as the radial location 374 of the first and second output contact patches 370 and 372 increases.

The speed ratio may be selectively adjusted by moving the location of the ring member axis of rotation 355 relative to the input disk axis of rotation 310 and/or the output disk axis of rotation 328, which effects the radial location 368 at which the ring member 342 engages the first and second input disks 306 and 308, and the radial location 374 at which the ring member 342 engages the first and second output disks 330 and 332. Moving the ring member 342 radially relative to the first and second input disks 304 and 306 results in corresponding movement of the ring member 342 relative to the first and second output disks 330 and 332. For example, moving the ring member 342 radially outward relative to the first and second input disks 306 and 308 also moves the ring member 342 radially inward relative to the first and second output disks 330 and 332. On the other hand, moving the ring member 342 radially inward relative to the first and second input disks 306 and 308 also moves the ring member 342 radially outward relative to the first and second output disks 330 and 332.

With continued reference to FIG. 11, the first input contact patch 364 is aligned substantially perpendicular to a first input contact patch vector 376 extending from the first input contact patch 364 to the input disk axis of rotation 310, and aligned substantially perpendicular to a second input contact patch vector 378 extending from the first input contact patch 364 to the ring member axis of rotation 355. Similarly, the first output contact patch 370 is aligned substantially perpendicular to a first output contact patch vector 380 extending from the first output contact patch 370 to the output disk axis of rotation 328, and aligned substantially perpendicular to a second output contact patch vector 382 extending from the first output contact patch 370 to the ring member axis of rotation 355. The configuration and arrangement of the various components of the continuously variable transmission 300 is such that a sum of a length of the first input contact patch vector 376 and a length of the first output contact patch vector 380 is greater than a length of the second input contact patch vector 378 and a length of the second output contact patch vector 382. The following relationship holds true for all speed ratios:

((length of first input contact patch vector 376)+
  (length of first output contact patch vector 380))
  >(length of second input contact patch vector
  378); and     A.

((length of first input contact patch vector 376)+
  (length of first output contact patch vector 380))
  >(length of second output contact patch vector
  382)     B.

A similar relationship also holds true for the second input contact patch 366 and the second output contact patch 372. For example, a sum of a length of a first input contact patch vector length extending from the second input contact patch 366 to the input disk axis of rotation 310 and aligned substantially perpendicular to the second input contact patch 366, and a length of a first output contact patch vector length extending from the second output contact patch 372 to the output disk axis of rotation 328 and aligned substantially perpendicular to the second output contact patch 372 is greater than at least one of a length of a second input contact patch vector length extending from the second input contact patch 366 to the ring member axis of rotation 355 and aligned substantially perpendicular to the second input contact patch 366, and a length of a second output contact patch vector length extending from the second output contact patch 372 to the ring member axis of rotation 355 and aligned substantially perpendicular to the second output contact patch 372.

With reference to FIGS. 11 and 12, the speed ratio selector 344 may be used to selectively adjust the speed ratio of the continuously variable transmission 300. FIG. 11 illustrates the speed ratio selector 344 arranged in a first speed ratio position. In this position the ring member 342 engages the first and second output disks 330 and 332 near their respective outer edges 334 and 338, and the ring member 342 engages the first and second input disks 306 and 308 closer toward the input disk axis of rotation 310. This arrangement produces the lowest speed ratio (e.g., speed ratio=(rotational speed of output shaft 44)÷(rotational speed of input shaft 42)), wherein the output shaft 44 has a lower rotational speed than the input shaft 42.

FIG. 12 illustrate the speed ratio selector 344 arranged in a second speed ratio position. In this position the ring member 342 engages the first and second input disks 306 and 308 near their respective outer edges 312 and 320, and the ring member 346 engages the first and second output disks 330 and 332 closer toward the output disk axis of rotation 328. This arrangement produces the highest speed ratio, wherein the output shaft 44 has a higher rotational speed than the input shaft 42. The speed ratio selector 60 may be infinitely adjustable between the first speed ratio position (for example, as illustrated in FIG. 11) and the second speed ratio position (for example, as illustrated in FIG. 12).

As described previously, input biasing mechanism 329 and output biasing mechanism 341 may include various configurations. An example of one such configuration is illustrated in FIGS. 13 and 14, which includes a hydraulic system used to produce the biasing force for controlling the traction forces generated between the ring member 342 and the first and second input disks 306 and 308 and the first and second output disks 330 and 332. This particular configuration of the input and output biasing mechanisms 329 and 341 utilizes hydraulic pressure to generate a biasing force for urging the second input disk 308 toward the first output disk 306 and the second output disk 332 toward the first output disk 330. Input biasing mechanism 329 may include a hydraulic reservoir 384 configured to exert a biasing force against the second input disk 308. The hydraulic reservoir 384 may be defined by a rear surface 385 of the second input disk 308 and a cover 386 positioned adjacent the second input disk 308. The second input disk 308 may slideably engage the input shaft 42. The cover 386 may include a generally cylindrically-shaped flange 387 that slideably engages a generally cylindrically-shaped flange 388 extending from the rear surface 385 of the second input disk 308. A seal 389, such as an O-ring, may be disposed between the flange 387 of the cover 386 and the flange 388 of the second input disk 308 to prevent hydraulic fluid from escaping hydraulic reservoir 384. A seal 390 may be employed to seal an opening that may occur between the cover 386 and the input shaft 42 and an opening that may occur between the second input disk 308 and the input shaft 42.

The output biasing mechanisms 341 may be similarly configured as the input biasing mechanism 329. For example, the output biasing mechanism 341 may include a hydraulic reservoir 391 configured to exert a biasing force against the second output disk 332. The hydraulic reservoir 391 may be defined by a rear surface 392 of the second output disk 330 and a cover 393 positioned adjacent the second output disk 330. The second input disk 330 may slideably engage the output shaft 44. The cover 393 may include a generally cylindrically-shaped flange 394 that slideably engages a generally cylindrically-shaped flange 395 extending from the rear surface 392 of the second output disk 330. Seal 389, such as an O-ring, may be disposed between the flange 394 of the cover 393 and the flange 395 of the second output disk 330 to prevent hydraulic fluid from escaping hydraulic reservoir 391. Seal 390 may be employed to seal an opening that may occur between the cover 393 and the output shaft 44 and an opening that may occur between the second output disk 330 and the output shaft 44.

A fluid passage 396 may fluidly connect the hydraulic reservoir 384 of the input biasing mechanism 329 to the hydraulic reservoir 391 of the output biasing mechanism 341. A hydraulic pump 397 may be fluidly connected to the fluid passage 396. The hydraulic pump 397 operates to control a pressure of the hydraulic fluid present within the system, and thus the traction forces generated between the ring member 342 and the first and second input disks 306 and 308 and the first and second output disks 330 and 332.

The input and output biasing mechanisms 329 and 341 operate in conjunction with one another to provide a generally consistent biasing force. The volume of the hydraulic reservoirs 384 and 391 may vary as the speed ratio of the continuously variable transmission 300 is varied. For example, FIG. 13 illustrates the continuously variable transmission 300 arranged in the first speed ratio position, and FIG. 14 illustrates the speed ratio selector 344 arranged in a second speed ratio position. With the speed ratio selector 342 arranged in the first speed ratio position (i.e., FIG. 13), the ring member 342 engages the first and second output disks 330 and 332 near their respective outer edges 334 and 338, and the ring member 342 engages the first and second input disks 306 and 308 closer toward the input disk axis of rotation 310. This arrangement produces a maximum separation between the first input disk 306 and the second input disk 308, and a minimum separation between the first output disk 330 and the second output disk 332. With the speed ratio selector 342 arranged in the second speed ratio position (i.e., FIG. 14), the ring member 342 engages the first and second input disks 306 and 308 near their respective outer edges 312 and 320, and the ring member 346 engages the first and second output disks 330 and 332 closer toward the output disk axis of rotation 328. This arrangement produces a minimum separation between the first input disk 306 and the second input disk 308, and a maximum separation between the first output disk 330 and the second output disk 332.

Selectively moving the ring member 342 from the first speed ratio position (i.e., FIG. 13) toward the second speed ratio position (i.e., FIG. 14) causes the second input disk 308 to move toward the first input disk 306 and thereby increase the volume of the hydraulic reservoir 384, and the second output disk 332 to move away from the first output disk 330, and thereby decrease the volume of the hydraulic reservoir 391. On the other hand, moving the ring member 342 from the second speed ratio position (i.e., FIG. 14) toward the first speed ratio position (i.e., FIG. 13) causes the second input disk 308 to move away from the first input disk 306 and thereby increase the volume of the hydraulic reservoir 384, and the second output disk 332 to move toward the first output disk 330 and thereby decrease the volume of the hydraulic reservoir 391. Hydraulic fluid may be transferred back and forth between the hydraulic reservoir 384 and hydraulic reservoir 391 through fluid passage 396 as the ring member 342 is cycled between the various speed ratio positions.

Figure 15:
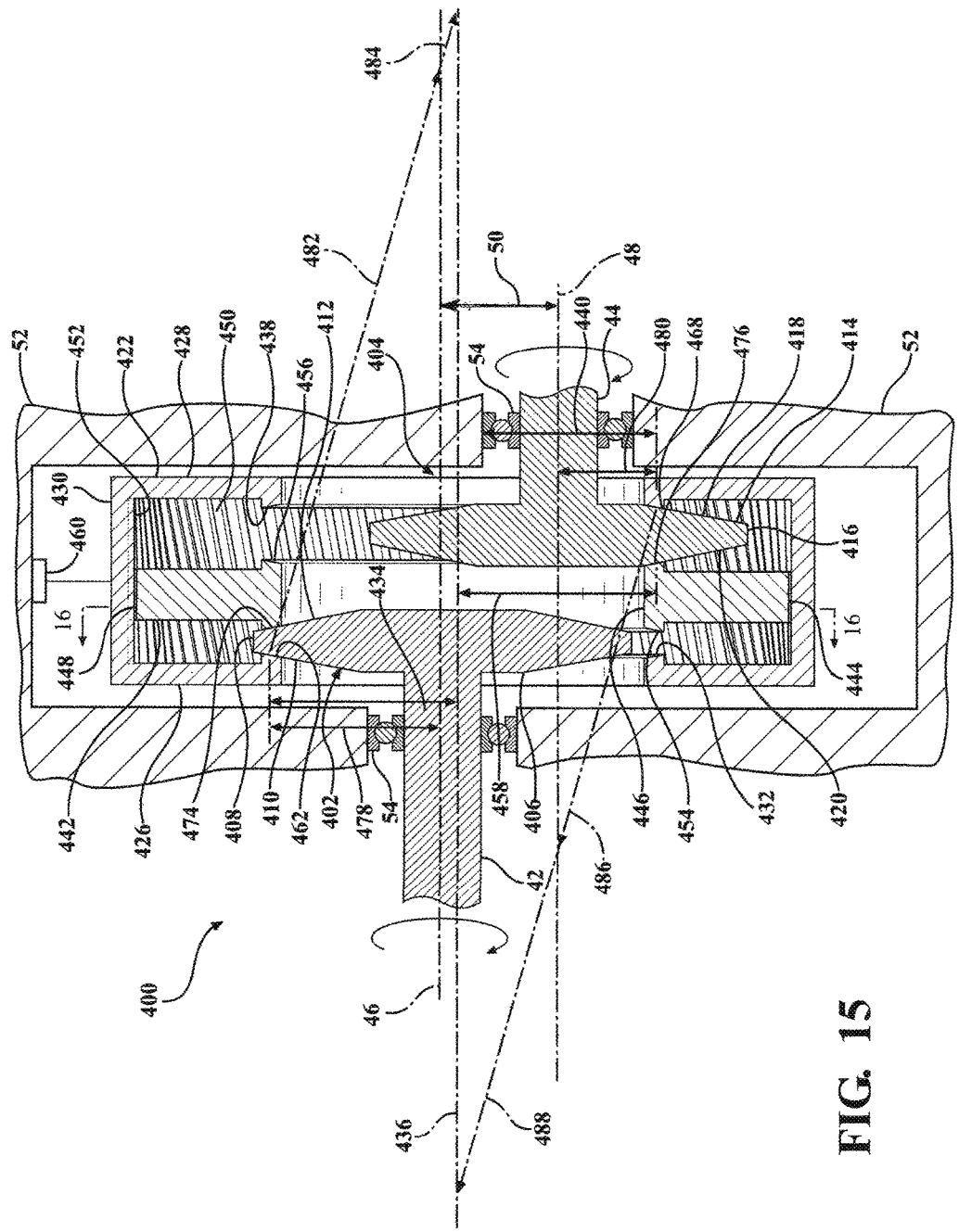
FIG. 15 is a schematic illustration of yet another alternately configured continuously variable transmission employing a geared ring member arrange in a first speed ratio position.

With reference to FIG. 15, an alternately configured exemplary continuously variable transmission 400 is operable for transferring rotational energy between the input shaft 42 and the output shaft 44. The input shaft 42 is rotatable about the input axis of rotation 46 and the output shaft 44 is rotatable about the output axis of rotation 48. The input axis of rotation 46 may be arranged substantially parallel to the output axis of rotation 48. The input axis of rotation 46 may be offset from the output axis of rotation 48 by the distance 50. The input and output shafts 42 and 44, respectively, may each be rotatably supported within the housing 52 by bearings 54. The position and orientation of the input shaft 42 is generally fixed relative to the output shaft 44.

The continuously variable transmission 400 may include an input drive mechanism 402 and an output drive mechanism 404 spaced from the input drive mechanism 402. The input and output drive mechanisms 402 and 404 may be arranged in series. The input and output drive mechanisms 402 and 404, respectively, operate in conjunction with one another to transfer rotational torque from the input shaft 42 to the output shaft 44.

The input drive mechanism 402 may employ an input disk 406 rotatable about the input axis of rotation 46. The input disk 406 may be fixedly attached or integrally formed with the input shaft 42. The input disk 406 extends generally radially outward from the input axis of rotation 46. An edge 408 defines an outer circumferential perimeter of the input disk 406. The input disk 406 may include a generally convex conically-shaped input disk first traction surface 410 and an opposite input disk second traction surface 412. The input disk first and second traction surfaces 410 and 412 may be generally configured as mirror opposites when viewed from the perspective of FIG. 15.

The output drive mechanism 404 may be similarly configured as the input drive mechanism 402, and may include for example, an output disk 414 rotatable about the output axis of rotation 48. The output disk 414 may be fixedly attached or integrally formed with the output shaft 48. The output disk 414 extends generally radially outward from the output axis of rotation 48. An edge 416 defines an outer circumferential perimeter of the output disk 414. The output disk 414 may include a generally convex conically-shaped output disk first traction surface 418 and an opposite output disk second traction surface 420. The output disk first and second traction surfaces 418 and 420 may be generally configured as mirror opposites when viewed from the perspective of FIG. 15.

The continuously variable transmission 400 may include a ring member 422 operably connecting the input drive mechanism 402 to the output drive mechanism 404. The ring member 422 may be moved radially relative to the input drive mechanism 402 and the output drive mechanism 404. The radial location of the ring member 422 may be selectively adjusted relative to the input and output drive mechanisms 402 and 404 to vary the speed ratio (e.g., speed ratio=(rotational speed of output shaft 44)÷(rotational speed of input shaft 42)) of the continuously variable transmission 400.

The ring member 422 may include a pair of interconnected co-rotating rings. The co-rotating rings may include an input traction ring 426 that engages the input disk first traction surface 410, and an output traction ring 428 that engages the output disk first traction surface 418. A generally cylindrical-shaped connecting ring 430 may fixedly connect the input traction ring 426 to the output traction ring 428. The input and output traction rings 426 and 428 may be arranged substantially parallel to one another and substantially perpendicular to the input and output axis of rotation 46 and 48.

The input traction ring 426 may include an input ring traction surface 432 engageable with the input disk first traction surface 410. The input ring traction surface 432 may be configured as a continuous ring. The input ring traction surface 432 may be located at a radius 434 from a ring member axis of rotation 436.

The output traction ring 428 may include an output ring traction surface 438 engageable with the output disk first traction surface 418. The output ring traction surface 438 may be configured as a continuous ring. The output ring traction surface 428 may be located at a radius 440 from the ring member axis of rotation 436. The output ring traction surface 438 and the input ring traction surface 432 may be arranged at opposite axial ends of the ring member 422, with the input ring traction surface 432 generally facing the output ring traction surface 438.

Figure 16:
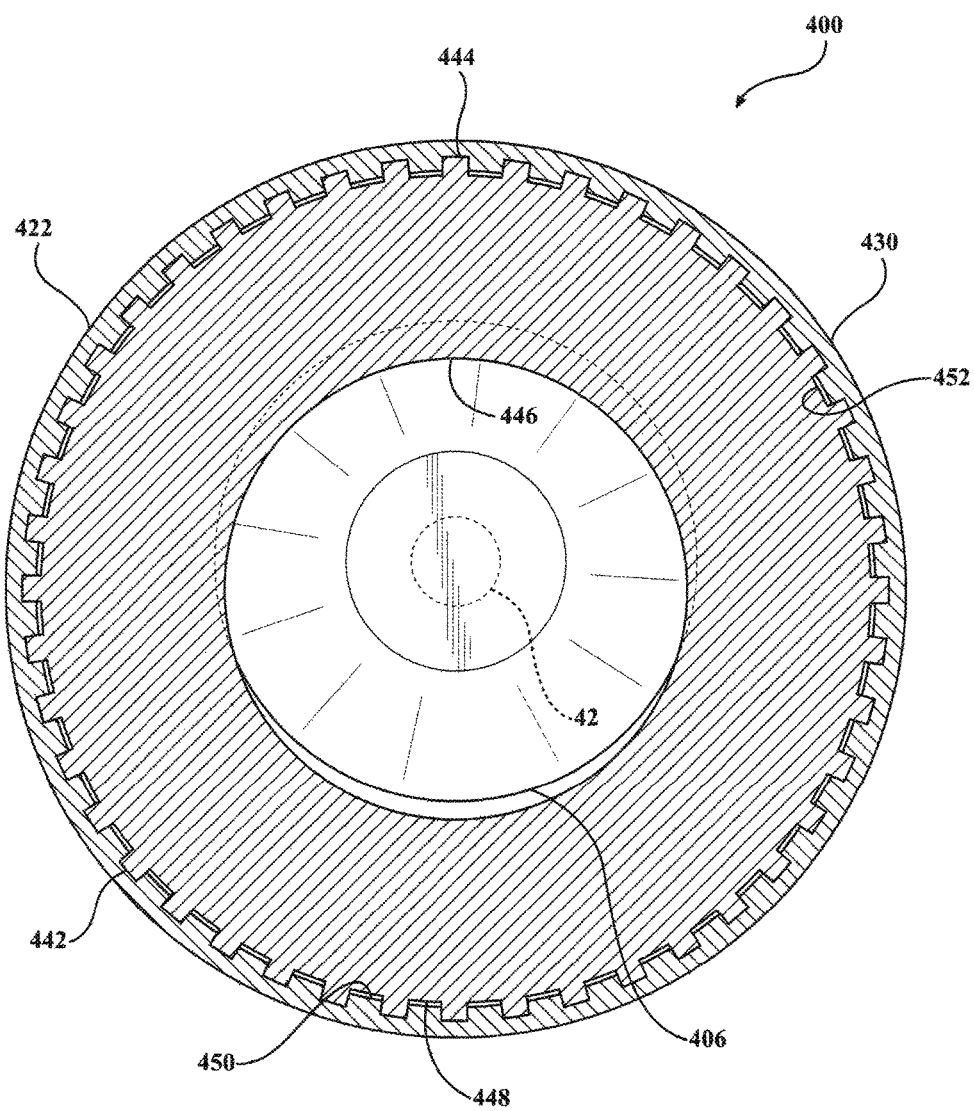
FIG. 16 is a partial cross-sectional view of the continuously variable transmission of FIG. 15 taken along section line 16-16.

With reference to FIGS. 15 and 16, the continuously variable transmission 400 may include an intermediate traction ring 442 disposed between the input traction ring 426 and the output traction ring 428. The intermediate traction ring 442 may be generally configured as an annular disk having an outer circumference 444 and an inner circumference 446. The intermediate traction ring 442 may be aligned generally parallel to the input and output traction rings 426 and 428 and substantially perpendicular to the ring member axis of rotation 436. The outer circumference 446 may include a helical spline 448, or similar connecting mechanism, that slideably engages a corresponding connecting mechanism, for example a helical spline 450, located on an inner circumference 452 of the connecting ring 430. The helical splines 448 and 450 enable the intermediate traction ring 442 to move axially along an axial path of travel (i.e., along ring member axis of rotation 436) relative to the ring member 422 while maintaining the angular orientation of the intermediate traction ring relative to the input and output traction rings 426 and 428 and the ring member axis or rotation 436. The helical splines 448 and 450 operate to rotatably fix the intermediate traction ring 442 to the ring member 422, thereby causing the intermediate traction ring to rotate in substantial unison with the input and output traction rings 426 and 428.

Figure 17:
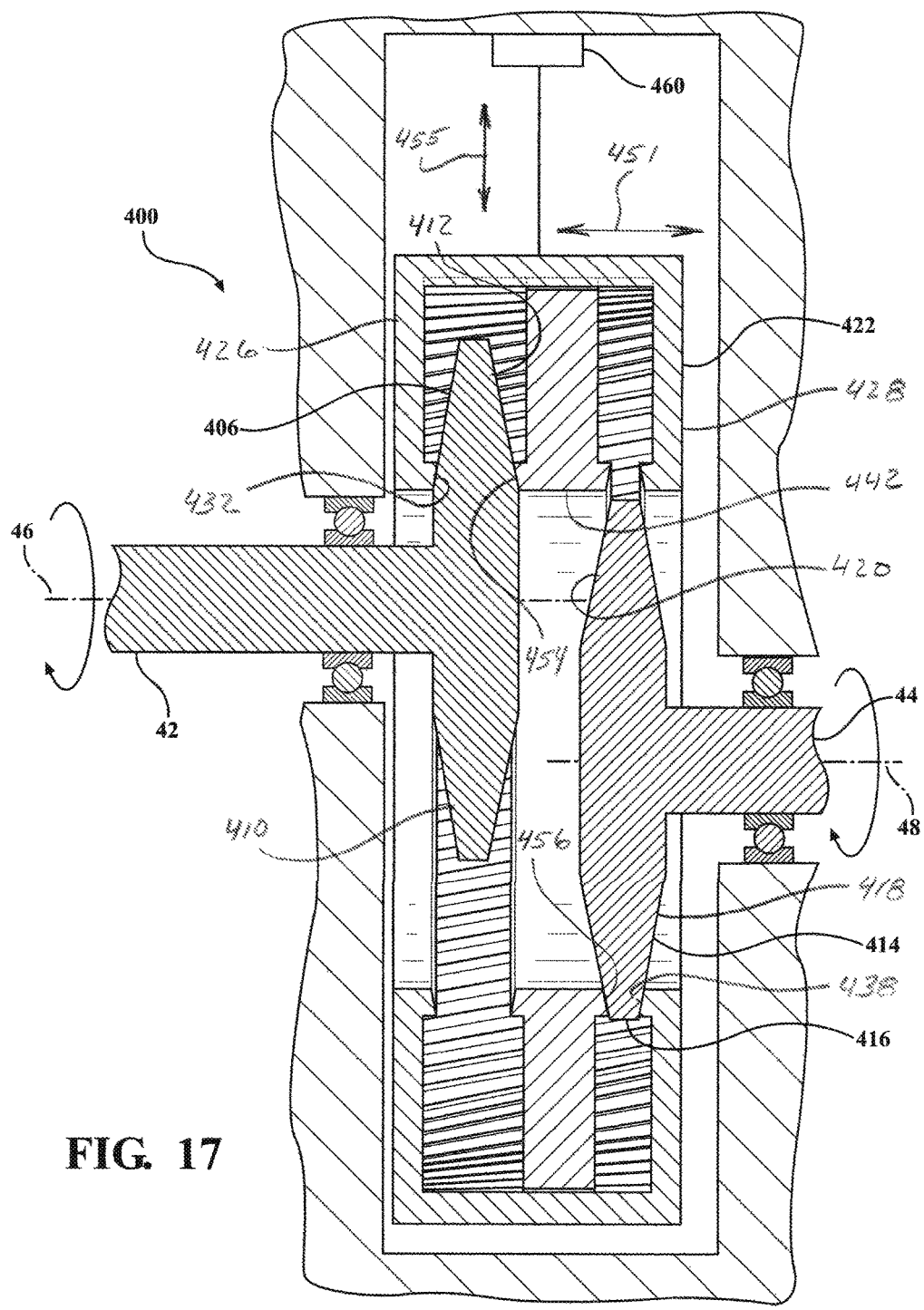
FIG. 17 is a schematic illustration of the continuously variable transmission of FIG. 15, with the ring member arranged in a second speed ratio position.

With reference to FIGS. 15 and 17, moving ring member 422 radially along radial path of travel 455 causes a corresponding axial movement of ring member 422 and intermediate traction ring 442 in opposite directions along axial path of travel 451. For example, moving ring member 422 radially upward as viewed from the perspective of FIGS. 15 and 17) from the radial position illustrated in FIG. 17 to the radial position illustrated in FIG. 15 causes input traction ring 426 to move rightward (as viewed from the perspective of FIGS. 15 and 17) as input ring traction surface 432 travels radially outward along input disk first traction surface 410 and output ring traction surface 438 travels radially inward along output disk first traction surface 418. This also causes intermediate traction ring 442 to move leftward (as viewed from the perspective of FIGS. 15 and 17) as intermediate input traction surface 454 travels radially outward along input disk second traction surface 412 and intermediate output traction surface 456 travels radially inward along output disk second traction surface 420. Moving ring member 422 radially downward (as viewed from the perspective of FIGS. 15 and 17) causes input traction ring 426, output traction ring 438 and the intermediate traction ring 442 to move axially along axial path of travel 451 in a direction opposite the direction when moving the ring member 422 radially upward.

The intermediate traction ring 442 may include an intermediate input traction surface 454 engageable with the input disk second traction surface 412. The intermediate input traction surface 454 may be configured as a continuous ring. The intermediate input traction surface 454 may be located at a radius 458 from the ring member axis of rotation 436.

The intermediate traction ring 442 may include an intermediate output traction surface 456 engageable with the output disk second traction surface 420. The intermediate output traction surface 456 may be configured as a continuous ring. The intermediate output traction surface 456 may be located at the radius 458 from the ring member axis of rotation 436. The intermediate output traction surface 458 and the intermediate input traction surface 454 may be arranged on opposite sides of the intermediate traction ring 442, with the intermediate input traction surface 454 generally facing in an opposing direction of the intermediate output traction surface 456.

The ring member 422 may be moved radially along a radial path of travel 455 relative to the input drive mechanism 402 and the output drive mechanism 404. The radial location of the ring member 422 may be selectively adjusted relative to the input and output drive mechanisms 402 and 404 to vary the speed ratio (e.g., speed ratio=(rotational speed of output shaft 44)÷(rotational speed of input shaft 42)) of the continuously variable transmission 400.

A speed ratio selector 460 may be operably connected to the ring member 422 to selectively adjust the speed ratio of the continuously variable transmission 400. The speed ratio selector 460 operates to adjust the radial location of the ring member 422 relative to the input and output drive mechanisms 402 and 404 to achieve a selected speed ratio. The speed ratio selector 460 may have any of a wide variety of configurations. The speed ratio selector 460 may employ any device capable of adjusting a location of the ring member 460 relative to the input disk 406 of the input drive mechanism 402, and the output disk 414 of the output drive mechanism 404.

The continuously variable transmission 400 operates to transfer torque from the input shaft 42 to the output shaft 44. Torque from the input shaft 42 may be transferred from the input disk 406 to the ring member 422 across a first input contact patch 462 where the input ring traction surface 432 engages the input disk first traction surface 410.

Torque may be transferred from the ring member 422 to the output disk 414 across a first output contact patch 468 where the output ring traction surface 438 engages the output disk first traction surface 418. Torque transferred from the ring member 422 to output disk 414 may be output through the output shaft 44.

Torque from the input shaft 42 may also be transferred from the input disk 406 through the intermediate traction ring 442 to the output disk 414. Torque from the input disk 406 may be transmitted across a second input contact patch 474 where the intermediate input traction surface 454 of the intermediate traction ring 442 engages the input disk second traction surface 412. Torque may be transferred from the intermediate traction ring 442 to the output disk 414 across a second output contact patch 476 where the intermediate output traction surface 456 of the intermediate traction ring 442 engages the output disk second traction surface 420. The first and second input contact patches 462 and 474 are located at a radius 478 from the input axis of rotation 46. The first and second output contact patches 468 and 476 are located at a radius 480 from the output axis of rotation 48. The radius 478 of the first and second input contact patches 462 and 474, and the radius 480 of the first and second output contact patches 468 and 476 varies as the speed ratio of the continuously variable transmission 400 is varied.

The input and output shafts 42 and 44 exert their respective torques on the input disk first and second traction surfaces 410 and 412 and the output disk first and second traction surfaces 418 and 420, respectively. The torques generate equal and opposite forces at the first input and output contact patches 462 and 468 and the second input and output contact patches 474 and 476. The forces may be transmitted from the input disk 406 to the output disk 414 by traction contact between the input and output disks 406 and 414 and the ring member 422.

The traction forces generated at the input first input contact patch 462 and the first output contact patch 468 includes a radial component that urges the ring member 422 tightly into contact with the input and output disks 406 and 414 to help maintain a position of the ring member 422 relative to the input and output disks 406 and 414. A tangential component transmits a tractive force between the ring member 422 and the input and output disks 406 and 414. A normal component is dependent on the geometry of the input and output disks 406 and 414 and a circumferential location of the contact patches 462 and 468 relative to one another, and is generally adequate to prevent slippage between the input and output disks 406 and 414 and the ring member 422. The input disk second traction surface 412 and output disk second traction surface 420 experiences a set of forces that balance the forces on the opposite input disk first traction surface 410 and the output disk first traction surface 418.

The vector component forces (i.e., radial, tangential and normal) acting at the first and second input contact patches 462 and 474 and the first and second output contact patches 468 and 476 generally balance to produce a net zero force. The opposing forces tend to cause the ring member 422 and intermediate traction ring 442 to pinch the input and output disks 406 and 414 to produce sufficient clamping force between the ring member 422 and intermediate traction ring 442 and the input and output disks 406 and 414 to accomplish traction without slip.

The speed ratio of the continuously variable transmission 400 is a function of the radial location 478 of the first and second input contact patches 462 and 474, and the radial location 480 of the first and second output contact patches 468 and 476. The speed ratio of the continuously variable transmission 400 is partially determined by the radial location at which the input ring traction surface 432 engages the input disk first traction surface 410 and the radial location at which the intermediate input traction surface 454 engages the input disk second traction surface 412 (i.e., the radial location 478 of the first and second input contact patches 462 and 474). The rotational speed of the output shaft 44 increases, relative to the rotational speed of the input shaft 42, as the radial location 478 of the first and second input contact patches 462 and 474 increases. On the other hand, the rotational speed of the output shaft 44 decreases as the radial location 478 of the first and second input contact patches 462 and 474 decreases.

The radial location at which the output ring traction surface 438 engages the output disk first traction surface 418 and the radial location at which the intermediate output traction surface 456 engages the output disk second traction surface 420 (i.e., the radial location 480 of the first and second output contact patches 468 and 476) has a compounding influence on speed ratio. The rotational speed of the output shaft 44 increases, relative to the rotational speed of the input shaft 42, as the radial location 480 of the first and second output contact patches 468 and 476 decreases. On the other hand, the rotational speed of the output shaft 44 decreases as the radial location 480 of the first and second output contact patches 468 and 476 increases.

The speed ratio may be selectively adjusted by moving the location of the ring member axis of rotation 436 relative to the input axis of rotation 46 and/or the output axis of rotation 48, which effects the radial location 478 at which the ring member 422 engages the input disk 406, and the radial location 480 at which the ring member 422 engages the output disk 414. Moving the ring member 422 radially relative to the input disk 406 results in corresponding movement of the ring member 422 relative to the output disk 414. For example, moving the ring member 422 radially outward relative to the input disk 406 also moves the ring member 422 radially inward relative to the output disk 414. On the other hand, moving the ring member 422 radially inward relative to the input disk 406 also moves the ring member 422 radially outward relative to the output disk 414.

With continued reference to FIG. 15, the first input contact patch 462 is aligned substantially perpendicular to a first input contact patch vector 482 extending from the first input contact patch 462 to the input axis of rotation 46, and aligned substantially perpendicular to a second input contact patch vector 484 extending from the first input contact patch 462 to the ring member axis of rotation 436. Similarly, the first output contact patch 468 is aligned substantially perpendicular to a first output contact patch vector 486 extending from the first output contact patch 468 to the output axis of rotation 48, and aligned substantially perpendicular to a second output contact patch vector 488 extending from the first output contact patch 468 to the ring member axis of rotation 436. The configuration and arrangement of the various components of the continuously variable transmission 400 is such that a sum of a length of the first input contact patch vector 482 and a length of the first output contact patch vector 486 is greater than a length of the second input contact patch vector 484 and a length of the second output contact patch vector 488. The following relationship holds true for all speed ratios:

((length of first input contact patch vector 482)+
(length of first output contact patch vector 486))
>(length of second input contact patch vector
484); and     A.

((length of first input contact patch vector 482)+
(length of first output contact patch vector 486))
>(length of second output contact patch vector
488)     B.

A similar relationship also holds true for the second input contact patch 474 and the second output contact patch 476. For example, a sum of a length of a first input contact patch vector length extending from the second input contact patch 474 to the input axis of rotation 46 and aligned substantially perpendicular to the second input contact patch 474, and a length of a first output contact patch vector length extending from the second output contact patch 476 to the output axis of rotation 48 and aligned substantially perpendicular to the second output contact patch 476 is greater than at least one of a length of a second input contact patch vector length extending from the second input contact patch 474 to the ring member axis of rotation 436 and aligned substantially perpendicular to the second input contact patch 474, and a length of a second output contact patch vector length extending from the second output contact patch 476 to the ring member axis of rotation 436 and aligned substantially perpendicular to the second output contact patch 476.

With reference to FIGS. 15 and 17, the speed ratio selector 460 may be used to selectively adjust the speed ratio of the continuously variable transmission 400. FIG. 15 illustrates the speed ratio selector 460 arranged in a first speed ratio position. In this position the ring member 422 engages the input disk 406 near its respective outer edge 408, and the ring member 422 engages the output disk 414 closer toward the output axis of rotation 48. This arrangement produces the highest speed ratio (e.g., speed ratio=(rotational speed of output shaft 44)÷(rotational speed of input shaft 42)), wherein the output shaft 44 has a higher rotational speed than the input shaft 42.

FIG. 17 illustrate the speed ratio selector 460 arranged in a second speed ratio position. In this position the ring member 422 engages the output disk 414 near its outer edge 416, and the ring member 422 engages the input disk 406 closer toward the input axis of rotation 46. This arrangement produces the lowest speed ratio, wherein the output shaft 44 has a lower rotational speed than the input shaft 42. The speed ratio selector 460 may be infinitely adjustable between the first speed ratio position (for example, as illustrated in FIG. 15) and the second speed ratio position (for example, as illustrated in FIG. 17).

Figure 18:
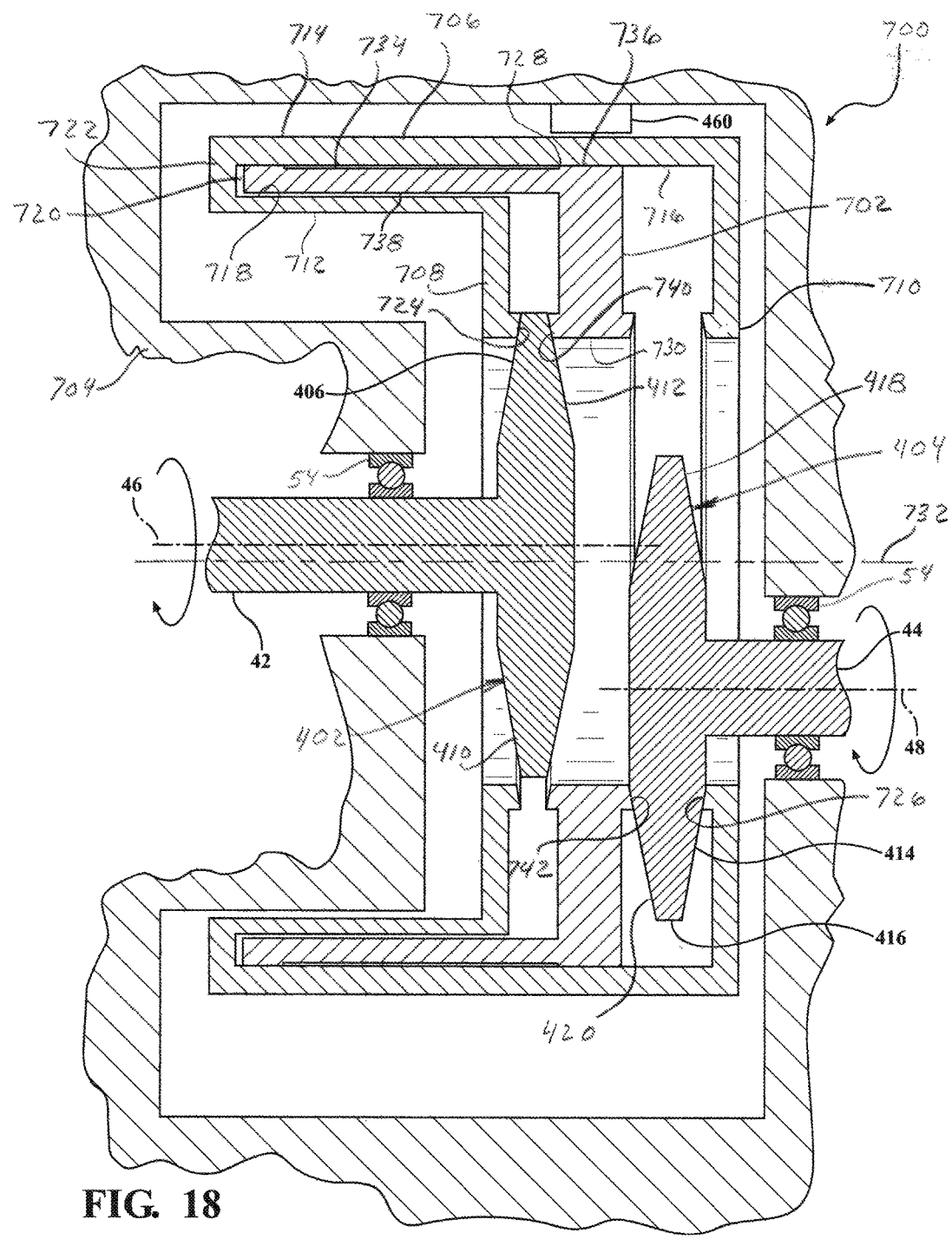
FIG. 18 is a schematic illustration of yet another alternately configured continuously variable transmission employing a piloted ring member arranged in a first speed ratio position.

With reference to FIG. 18, an alternately configured exemplary continuously variable transmission 700 is operable for transferring rotational energy between input shaft 42 and the output shaft 44. Continuously variable transmission 700 is similarly configured as continuously variable transmission 400, but utilizes an alternate mechanism for controlling alignment of an intermediate traction ring 702 and a ring member 706 relative to input disk 406 and output disk 414. Intermediate traction ring 702 and ring member 706 operably connect input drive mechanism 402 to output drive mechanism 404. Ring member 706 and intermediate traction ring 702 may be selectively moved in unison radially relative to the input drive mechanism 402 and the output drive mechanism 404. The radial location of the ring member 706 and the intermediate traction ring 702 may be selectively adjusted relative to the input and output drive mechanisms 402 and 404 to vary the speed ratio (e.g., speed ratio=(rotational speed of output shaft 44)÷(rotational speed of input shaft 42)) of the continuously variable transmission 700.

The ring member 706 may include a pair of interconnected co-rotating rings. The co-rotating rings may include an input traction ring 708 that engages the input disk first traction surface 410, and an output traction ring 710 that engages the output disk first traction surface 418. The input and output traction rings 708 and 710 may be arranged substantially parallel to one another and substantially perpendicular to the input and output axis of rotation 46 and 48.

Input traction ring 708 may include a generally cylindrical-shaped input traction ring support 712 extending laterally outward from input traction ring 708. Output traction ring 710 may include an output traction ring support 714 extending laterally outward from output traction ring 710. Output traction ring support 714 may be sized larger (i.e., have a larger diameter) than input traction ring support 712.

Output traction ring support 714 extends around and at least partially overlays input traction ring support 712. An inner circumference 716 of output traction ring support 714 may have a larger diameter than a diameter of an outer circumference 718 of input traction ring support 712, thereby forming a circumferential annulus 720 between input traction ring support 712 and output traction ring support 714. Input and output traction ring supports 712 and 714 may be fixedly connected to one another by a radial connector 722 to cause input traction ring 708 and output traction ring 710 to rotate in unison.

The input traction ring 708 may include an input ring traction surface 724 engageable with the input disk first traction surface 410. The input ring traction surface 724 may be configured as a continuous ring.

The output traction ring 710 may include an output ring traction surface 726 engageable with the output disk first traction surface 418. The output ring traction surface 726 may be configured as a continuous ring. The output ring traction surface 726 and the input ring traction surface 724 may be arranged so as to generally face one another.

With reference to FIGS. 15 and 16, the continuously variable transmission 700 may include the intermediate traction ring 702 disposed between the input traction ring 708 and the output traction ring 710. The intermediate traction ring 702 may be generally configured as an annular disk having an outer circumference 728 and an inner circumference 730. The intermediate traction ring 702 may be aligned generally parallel to the input and output traction rings 708 and 710 and substantially perpendicular to the ring member axis of rotation 732. The outer circumference 728 may include a generally cylindrical-shaped input traction ring support 734 extending laterally outward from intermediate traction ring 702. Intermediate traction ring support 734 at least partially extends into the annulus 720 formed between output traction ring support 714 and input traction ring support 712. An outer circumference 736 of intermediate traction ring support 734 may slideably engage the inner circumference 716 of output traction ring support 714. This arrangement enables the intermediate traction ring 702 to move axially (i.e., along ring member axis of rotation 732) relative to the ring member 706 while maintaining the angular orientation of the intermediate traction ring 734 relative to the input and output traction rings 708 and 710 and the ring member axis or rotation 732. Alternatively, an inner circumference 738 of intermediate traction ring support 734 may slideably engage the outer circumference 718 of input traction ring support 712.

The intermediate traction ring 702 may include an intermediate input traction surface 740 engageable with the input disk second traction surface 412. The intermediate input traction surface 740 may be configured as a continuous ring.

The intermediate traction ring 702 may include an intermediate output traction surface 742 engageable with the output disk second traction surface 420. The intermediate output traction surface 742 may be configured as a continuous ring. The intermediate output traction surface 742 and the intermediate input traction surface 740 may be arranged on opposite sides of the intermediate traction ring 702, with the intermediate input traction surface 740 generally facing in an opposing direction of the intermediate output traction surface 742.

Figure 19:
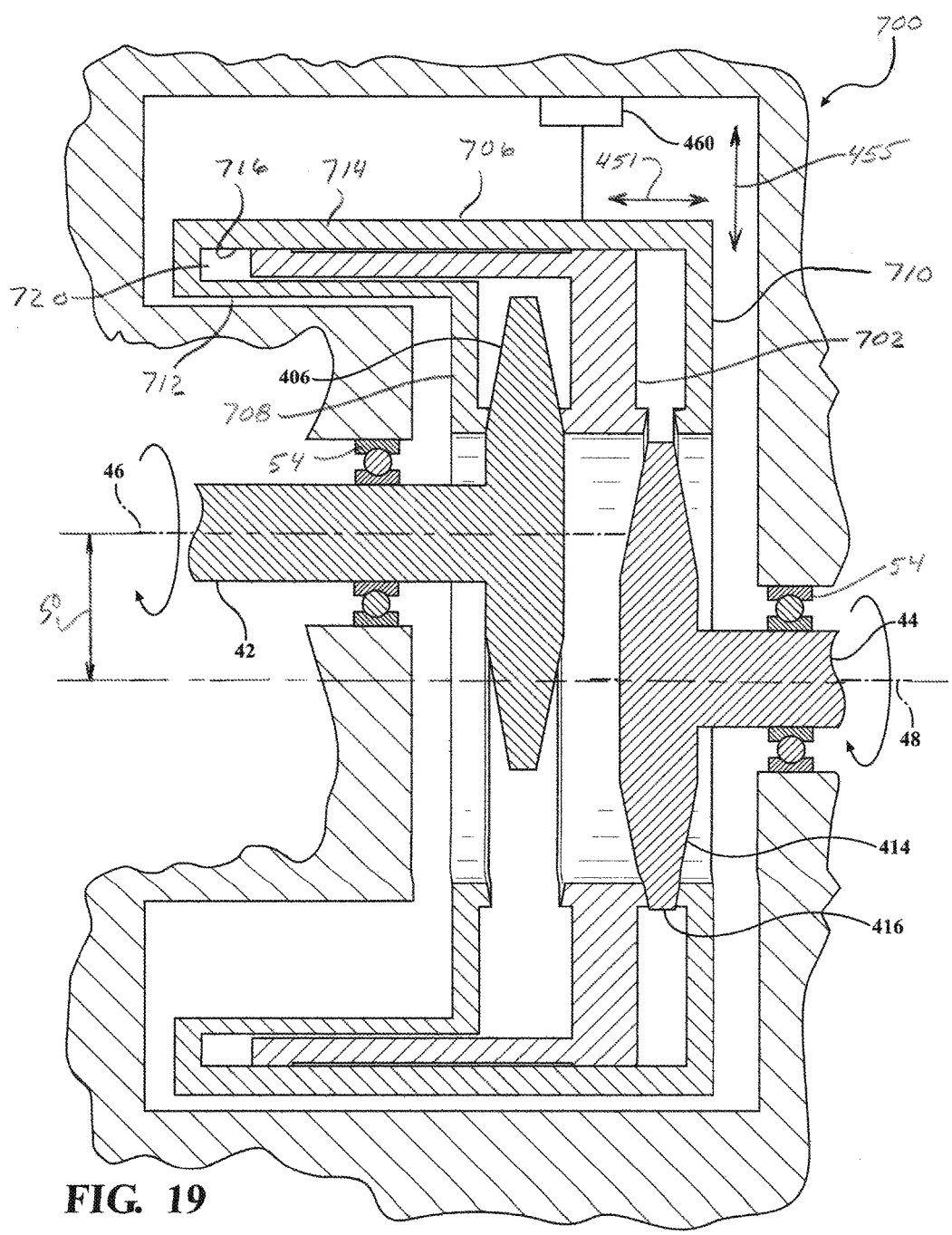
FIG. 19 is a schematic illustration of the continuously variable transmission of FIG. 18, with the ring member arranged in a second speed ratio position.

With continued reference to FIGS. 18 and 19, moving ring member 706 radially along radial path of travel 455 causes a corresponding axial movement of ring member 422 and intermediate traction ring 442 in opposite directions along axial path of travel 451. For example, moving ring member 422 radially upward (as viewed from the perspective of FIGS. 18 and 19) from the radial position illustrated in FIG. 19 to the radial position illustrated in FIG. 18 causes input traction ring 708 to move rightward (as viewed from the perspective of FIGS. 18 and 19) as input ring traction surface 724 travels radially outward along input disk first traction surface 410 and output ring traction surface 726 travels radially inward along output disk first traction surface 418. This also causes intermediate traction ring 702 to move leftward (as viewed from the perspective of FIGS. 18 and 19) as intermediate input traction surface 740 travels radially outward along input disk second traction surface 412 and intermediate output traction surface 742 travels radially inward along output disk second traction surface 420. Moving ring member 706 radially downward (as viewed from the perspective of FIGS. 18 and 19) causes input traction ring 708, output traction ring 710 and the intermediate traction ring 702 to move axially along axial path of travel 451 in a direction opposite the direction when moving the ring member 706 radially upward.

The ring member 706 may be moved radially along path of travel 455 relative to the input drive mechanism 402 and the output drive mechanism 404. The radial location of the ring member 706 may be selectively adjusted relative to the input and output drive mechanisms 402 and 404 to vary the speed ratio (e.g., speed ratio=(rotational speed of output shaft 44)÷(rotational speed of input shaft 42)) of the continuously variable transmission 700.

The speed ratio selector 460 may be operably connected to the ring member 706 to selectively adjust the speed ratio of the continuously variable transmission 700. The speed ratio selector 460 operates to adjust the radial location of the ring member 706 relative to the input and output drive mechanisms 402 and 404 to achieve a selected speed ratio. The speed ratio may be selectively adjusted by moving the location of the ring member axis of rotation 473 relative to the input axis of rotation 46 and/or the output axis of rotation 48, which effects the radial locations at which the ring member 706 engages the input disk 406 and the output disk 414. Moving the ring member 706 radially relative to the input disk 406 results in corresponding movement of the ring member 706 relative to the output disk 414. For example, moving the ring member 706 radially outward relative to the input disk 406 also moves the ring member 706 radially inward relative to the output disk 414. On the other hand, moving the ring member 706 radially inward relative to the input disk 406 also moves the ring member 706 radially outward relative to the output disk 414

A common feature between the various exemplary configurations of the continuously variable transmission, among others, is that the sum of the input and output contact patch vector lengths (for example, a length of first input contact patch vector 154 and first output contact patch vector 158, as illustrated in FIG. 2) is greater than the lengths of corresponding ring member vectors 156 and 160 (for example, input ring member 102 as illustrated in FIG. 2). Also, each of the exemplary configurations depict the ring members as having their respective traction surfaces (for example, input ring first traction surface 112, as illustrated in FIG. 1) positioned at a fixed radius, whereas the radius of the corresponding disk traction surface (for example, first input disk traction surface 68, as illustrated in FIG. 1) varies, as this arrangement may generally provide the greatest range of drive ratios. Alternatively, the radial location of the disk traction surface may be fixed and the radial location of the ring traction surface may be allowed to vary as the means for adjusting the drive ratio.

Figure 20:
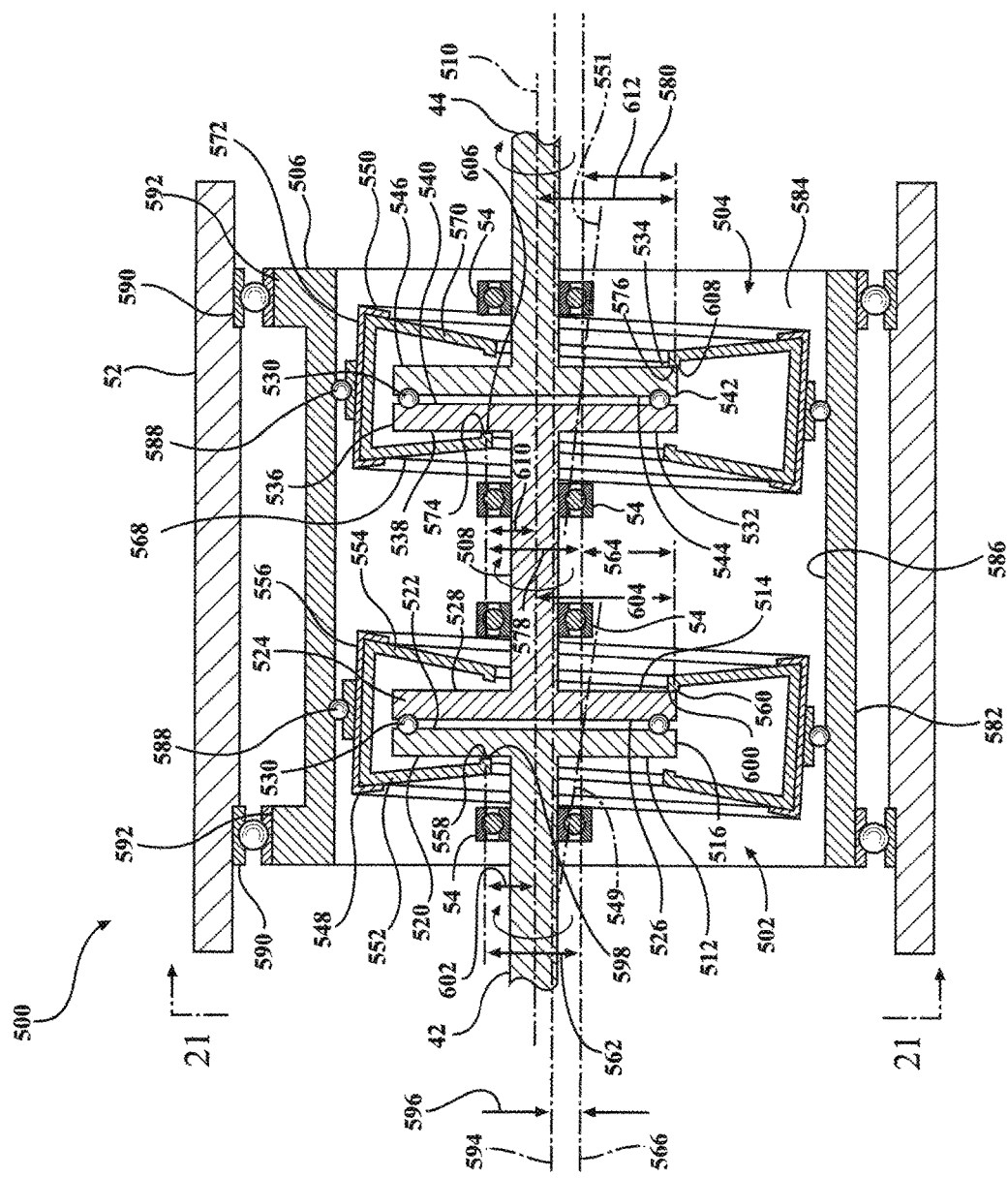
FIG. 20 is a schematic illustration of yet another alternately configured continuously variable transmission shown arranged in a first speed ratio position.
Figure 21:
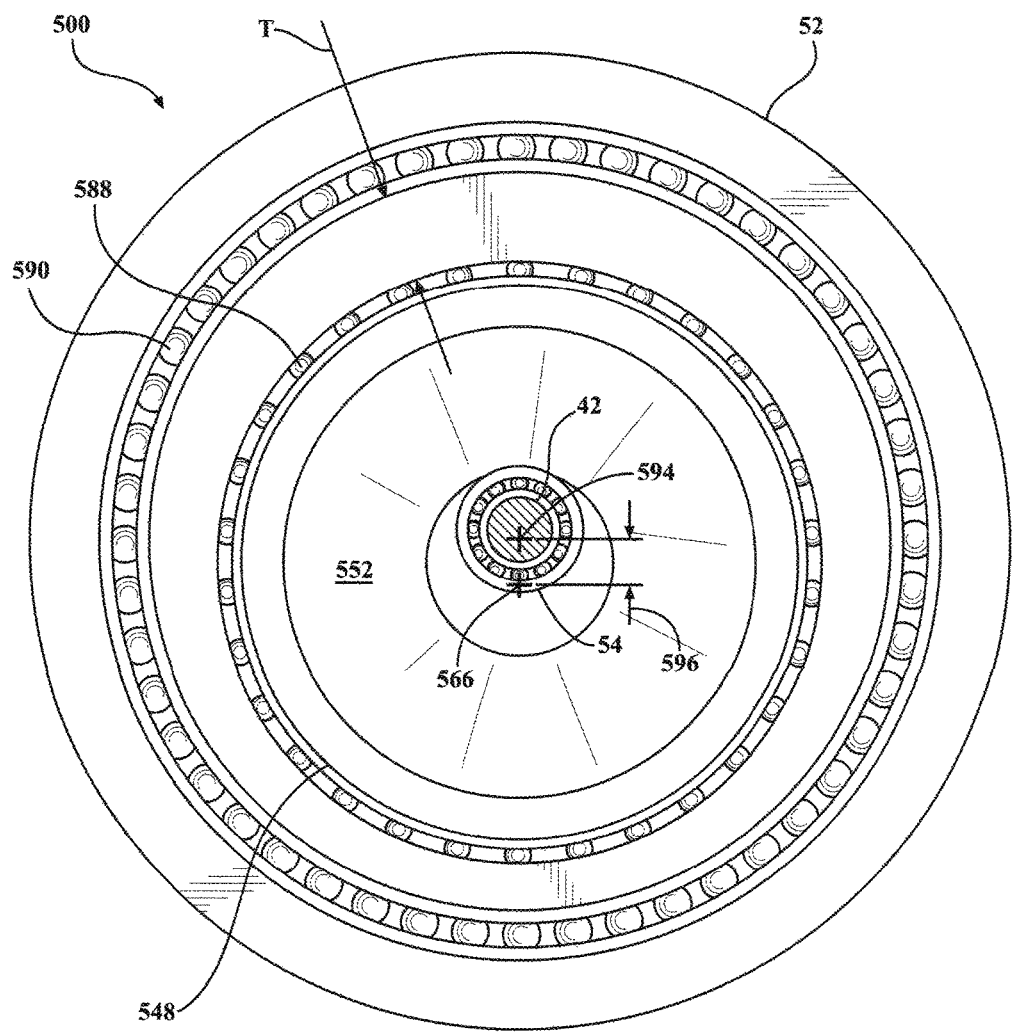
FIG. 21 is an end view of the continuously variable transmission illustrated in FIG. 20.

With reference to FIGS. 20 and 21, an exemplary two-stage continuously variable transmission 500 is operable for transferring rotational energy between the input shaft 42 and the output shaft 44. The two-stage continuously variable transmission 500 may include a first drive mechanism 502 and a second drive mechanism 504. The first and second drive mechanisms 502 and 504 may be arranged in series. The first and second drive mechanisms 502 and 504 operate to transfer rotational torque from the input shaft 42 to the output shaft 44. The first and second drive mechanisms 502 and 504 may be selectively adjusted to vary a speed ratio (e.g., speed ratio=(rotational speed of output shaft 44)÷(rotational speed of input shaft 42)) of the tow-stage continuously variable transmission 500. The two-stage continuously variable transmission 500 may employ a speed ratio selector 506 operable to selectively adjust the speed ratio.

The first drive mechanism 502 may be fixedly attached to the input shaft 42 and the second drive mechanism 504 may be fixedly attached to the output shaft 44. An intermediate shaft 508 operably connects the first drive mechanism 502 to the second drive mechanism 504. The input shaft 42 and the output shaft 44 are rotatable about a common axis of rotation 510. The position and orientation of the input shaft 42 is generally fixed relative to the output shaft 44.

The first drive mechanism 502 may employ a first input disk 512 and a first output disk 514 positioned adjacent the first input disk 512. The first input and output disks 512 and 514 are each rotatable about the axis of rotation 510. The first input and output disks 512 and 514 extend generally radially outward from the axis of rotation 510. An edge 516 defines an outer circumferential perimeter of the first input disk 512. The first input disk 512 may include a first input disk traction surface 520 positioned adjacent input shaft 42 and an opposite inner surface 522 positioned adjacent the first output disk 514. The inner surface 522 of the first input disk 62 may have generally planar surface contour, as illustrated, for example, in FIG. 20, or may include various other shapes and/or contours.

With continued reference to FIG. 20, an edge 524 defines an outer circumferential perimeter of the first output disk 514. The first output disk 514 may include an inner surface 526 positioned adjacent the first input disk 512 and a first output disk traction surface 528 located opposite the inner surface 526. The first output disk 514 may be generally configured as a mirror image of the first input disk 512 when viewed from the perspective of FIG. 20. Similar to first input disk 512, the inner surface 526 of the first output disk 514 may have generally planar surface contour, as illustrated, for example, in FIG. 20, or may include various other shapes and/or contours. The first output disk 514 may be fixedly attached to the intermediate shaft 508.

The first input disk 512 and the first output disk 514 may be rotatably supported relative to one another. For example, a bearing 530 may be disposed between the inner surface 522 of the first input disk 512 and the inner surface 526 of the first output disk 514. The bearing 530 may be integrally formed with the first input disk 512 and the first output disk 514, for example, as illustrated in FIG. 20, or may be configured as a separate component that attaches to the inner surface 522 of the first input disk 512 and the inner surface 526 of the first output disk 514.

The second drive mechanism 504 may be similarly configured as the first drive mechanism 502, and may include for example, a second input disk 532 and a second output disk 534 positioned adjacent the second input disk 532. The second input disk 532 and the second output disk 534 are each rotatable about the axis of rotation 510. The second input and output disks 532 and 534 extend generally radially outward from the axis of rotation 510.

An edge 536 defines an outer circumferential perimeter of the second input disk 532. The second output disk 534 may include a second input disk traction surface 538 and an opposite inner surface 540 positioned adjacent the second output disk 534. The inner surface 540 of the second input disk 532 may have generally planar surface contour, as illustrated, for example, in FIG. 20, or may include various other shapes and/or contours. The second input disk 532 may be fixedly attached to the intermediate shaft 508.

The second output disk 534 may be fixedly attached to the output shaft 44. An edge 542 defines an outer circumferential perimeter of the second output disk 534. The second output disk 534 may include an inner surface 544 positioned adjacent the second input disk 532 and a second output disk traction surface 546 located opposite the inner surface 544. The second output disk 534 may be generally configured as a mirror image of the second input disk 532 when viewed from the perspective of FIG. 20. Similar to second input disk 532, the inner surface 544 of the second output disk 534 may have a generally planar surface contour, as illustrated, for example, in FIG. 20, or may include various other shapes and/or contours.

The second input disk 532 and the second output disk 534 may be rotatably supported relative to one another. For example, the bearing 530 may be disposed between the inner surface 540 of the second input disk 532 and the inner surface 544 of the second output disk 534. The bearing 530 may be integrally formed with the second input disk 532 and the second output disk 534, for example, as illustrated in FIG. 20, or may be configured as a separate component that attaches to the inner surface 540 of the second input disk 532 and the inner surface 544 of the second output disk 534.

The first drive mechanism 502 may include a first ring member 548 that operates to rotatably couple the first input disk 512 to the first output disk 514. The first ring member 548 is rotatable about a first ring member axis of rotation 549. The first ring member axis of rotation 549 is oriented substantially perpendicular to a plane extending through a bearing 588 for rotatably supporting the first ring member 548. The first ring member 548 may be moved radially relative to the first input disk 512 and the first output disk 514. The radial location of the first ring member 548 may be selectively adjusted relative to the first input disk 512 and the first output disk 514 to vary the speed ratio of the first drive mechanism 502 (e.g., first drive mechanism speed ratio=(rotational speed of output shaft 44)÷(rotational speed of the intermediate shaft 508)).

The second drive mechanism 504 may include a second ring member 550 that operates to rotatably couple the second input disk 532 to the second output disk 534. The second ring member 550 is rotatable about a second ring member axis of rotation 551. The second ring member axis of rotation 551 is aligned substantially perpendicular to a plane extending through bearing 588 that rotatably supports the second ring member 550. The second ring member 550 may be moved radially relative to the second input disk 532 and the second first output disk 534. The radial location of the second ring member 550 may be selectively adjusted relative to the second input disk 532 and the second output disk 534 to vary the speed ratio of the second drive mechanism 504 (e.g., second drive mechanism speed ratio=(rotational speed of intermediate shaft 508)÷(rotational speed of the output shaft 44)).

The first ring member 548 may include a pair of interconnected co-rotating rings. The co-rotating rings may include an input traction ring 552 that engages the first input disk 512, and an output traction ring 554 spaced from the input traction ring 552 and which engages the first output disk 514. A generally cylindrical-shaped connecting ring 556 may fixedly connect the input traction ring 552 to the output traction ring 554. The input and output traction rings 552 and 554 extend generally radially inward from the connecting ring 556.

The input traction ring 552 may include a first ring member input traction surface 558 engageable with the first input disk traction surface 520 of the first input disk 512. The output traction ring 554 may include a first ring member output traction surface 560 engageable with the first output disk traction surface 528 of the first output disk 514. The first ring member input and output traction surfaces 558 and 560 may be configured as continuous rings. The first ring member input traction surface 558 may be located at a radius 562 from a ring member effective axis of rotation 566. The ring member effective axis of rotation 566 may not coincide with the first ring member axis of rotation 549 or the second ring member axis of rotation 551 depending on the orientation of bearing 588. Rather, the first and second ring member axis of rotation 549 and 551 may be oriented at an oblique angle relative to the ring member effective axis of rotation 566. The ring member effective axis or rotation 566 is aligned substantially parallel to the axis of rotation 510 of input shaft 42 and output shaft 44. The first ring member output traction surface 560 may be located at a radius 564 from the ring member effective axis of rotation 566. The first ring member input and output traction surfaces 558 and 560 are arranged on opposite sides of the first ring member 548, with the first ring member input traction surface 558 facing the first input disk 512 and the first ring member output traction surface 560 facing the first output disk 514.

The second ring member 550 may be similarly configured as the first ring member 548. The second ring member 550 may include a pair of interconnected co-rotating rings. The co-rotating rings may include an input traction ring 568 that engages the second input disk 532, and an output traction ring 570 spaced from the input traction ring 568 and which engages the second output disk 534. A generally cylindrical-shaped connecting ring 572 may fixedly connect the input traction ring 568 to the output traction ring 570. The input and output traction rings 568 and 570 extend generally radially inward from the connecting ring 572.

The input traction ring 568 may include a second ring member input traction surface 574 engageable with the second input disk traction surface 538 of the second input disk 532. The output traction ring 570 may include a second ring member output traction surface 576 engageable with the second output disk traction surface 546 of the second output disk 534. The second ring member input and output traction surfaces 574 and 576 may be configured as continuous rings. The second ring member input traction surface 574 may be located at a radius 578 from a ring member effective axis of rotation 566. The second ring member output traction surface 576 may be located at a radius 580 from the ring member effective axis of rotation 566. The first ring member input and output traction surfaces 574 and 576 are arranged on opposite sides of the second ring member 550, with the second ring member input traction surface 574 facing the second input disk 532 and the second ring member output traction surface 576 facing the second output disk 534.

The speed ratio selector 506 may be operably connected to the first and second ring members 548 and 550 to selectively adjust the speed ratio of the two-stage continuously variable transmission 500. The speed ratio selector 506 operates to adjust the radial location of the first ring member 548 relative to the first input disk 512 and the first output disk 514, and adjust the radial location of the second ring member 550 relative to the second input disk 532 and the second output disk 534, to achieve a selected speed ratio.

Figure 22:
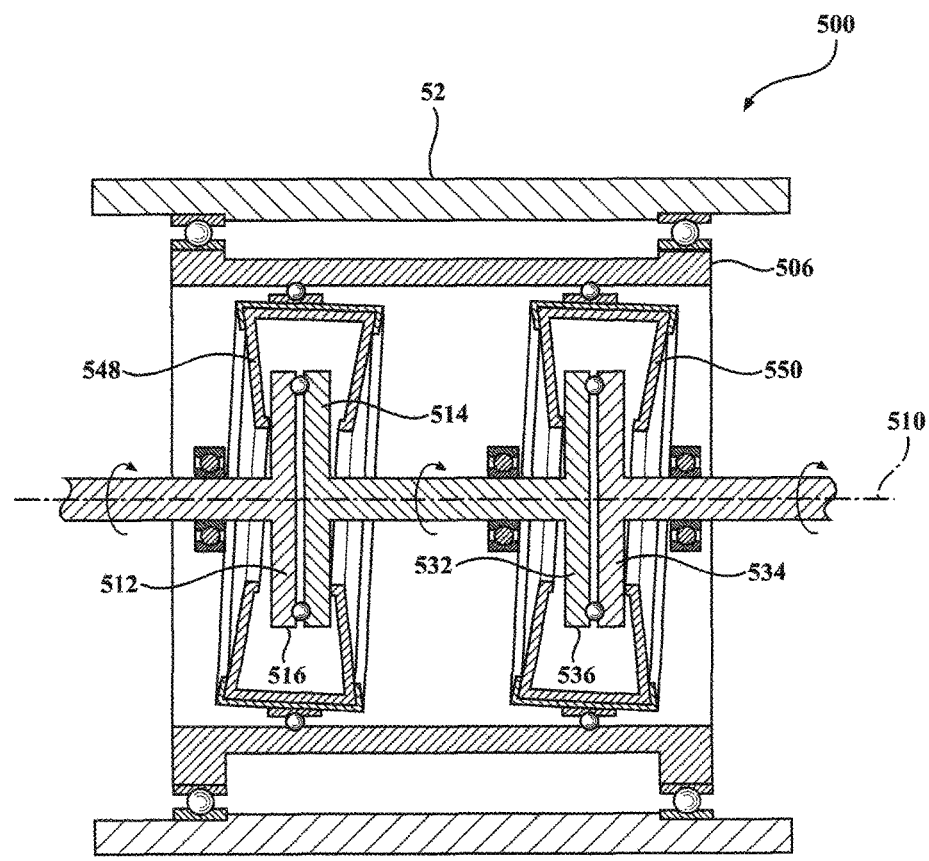
FIG. 22 is a schematic illustration of the continuously variable transmission of FIG. 20 shown arranged in a second speed ratio position.

The speed ratio selector 506 may have any of a wide variety of configurations. The speed ratio selector 506 may employ any device capable of adjusting a location of the first ring member 548 relative to the first input and output disks 512 and 514, and the location of the second ring member 550 relative to the second input and output disk 532 and 534. An example of one such configuration is illustrated in FIGS. 20-22.

With reference to FIGS. 20 and 21, the speed ratio selector 506 may include an actuator 582 having a hollow inner region 584 defined by a generally circular cylindrically-shaped inner surface 586. A longitudinal axis of the inner surface 586 substantially coincides with the ring member effective axis of rotation 566. The first and second ring members 548 and 550 may be rotatably disposed within the interior region 584 of the actuator 582. The first ring member 548 may be rotatably supported on a bearing 588 mounted on the inner surface 586 of the actuator 582. The second ring member 550 may be similarly rotatably mounted to the inner surface 586 of the actuator 582 using a second bearing 588. The bearing 588 may be configured as a separate component or may be at least partially integrally formed with the actuator 582 and/or first and second ring members 548 and 550.

The actuator 582 may be rotatably attached to the housing 55, for example, using one or more bearings 590. The bearing 590 may be mounted to an outer circumference 592 of the actuator 582 and the housing 55. The outer circumference 592 of the actuator 582 may have a generally circular shape with a center axis that coincides with an axis of rotation 594 of the actuator 582. The axis of rotation 594 of the actuator 582 may be offset from the ring member effective axis of rotation 566 by a distance 596. As a consequence, a thickness T of the actuator 582 varies circumferentially, as shown, for example, in FIG. 19, with a minimum and maximum thickness T of the actuator occurring on diametrically opposite sides of the actuator 582. The eccentricity between the inner surface 586 and the outer circumference 592 of the actuator 582 allows a radial location of the first and second ring members 548 and 550 to be selectively varied relative to the first input and output disks 512 and 514 and the second input and output disks 532 and 534 by rotating the actuator 582 about its axis of rotation 594.

The two-stage continuously variable transmission 500 operates to transfer torque from the input shaft 42 to the output shaft 44. Torque from the input shaft 42 may be transferred from the first input disk 512 to the first ring member 548 across a first input contact patch 598 where the first ring member input traction surface 558 engages the first input disk traction surface 520. Torque may be transferred from the first ring member 548 to the first output disk 514 across a first output contact patch 600 where the first ring member output traction surface 560 engages the first output disk traction surface 528. The first input contact patch 598 is located at a radius 602 from the input and output shaft axis of rotation 510, and the first output contact patch 600 is located at a radius 604 from the input and output shaft axis of rotation 510. The radius 602 of the first input contact patch 598 and the radius 604 of the first output contact patch 600 varies as the speed ratio of the two-stage continuously variable transmission 500 is varied.

Torque from the first output disk 514 is transmitted along the intermediate shaft 508 to the second input disk 532. Torque from the second input disk 532 may be transferred to the second ring member 550 across a second input contact patch 606 where the second ring member input traction surface 574 engages the second input disk traction surface 538. Torque may be transferred from the second ring member 550 to the second output disk 534 across a second output contact patch 608 where the second ring member output traction surface 576 engages the second output disk traction surface 546. The second input contact patch 606 is located at a radius 610 from the input and output shaft axis of rotation 510, and the second output contact patch 608 is located at a radius 612 from the input and output shaft axis of rotation 510. The radius 610 of the second input contact patch 606 and the radius 612 of the second output contact patch 608 varies as the speed ratio of the two-stage continuously variable transmission 500 is varied. Torque transferred from the second ring member 550 to second output disk 534 may be output through the output shaft 44.

The speed ratio of the two-stage continuously variable transmission 500 is a function of the radial locations 602 and 604 of the first input and output contact patches 598 and 600, respectively, and the radial locations 610 and 612 of the second input and output contact patches 606 and 608, respectively. The rotational speed of the output shaft 44 increases, relative to the rotational speed of the input shaft 42, as the radial locations 602 and 610 of the first and second input contact patches 598 and 606 respectively increase, and the radial locations 604 and 612 of the first and second output contact patches 608 and 612 respectively decrease. On the other hand, the rotational speed of the output shaft 44 decreases as the radial locations 602 and 610 of the first and second input contact patches 598 and 606 respectively decrease, and the radial locations 604 and 612 of the first and second output contact patches 608 and 612 respectfully increase.

With reference to FIGS. 20 and 22, the speed ratio selector 506 may be used to selectively adjust the speed ratio of the two-stage continuously variable transmission 500. FIG. 20 illustrates the speed ratio selector 506 arranged in a first speed ratio position. In this position the first and second ring members 548 and 550 engage the first and second output disks 514 and 534 near their respective outer edges 524 and 542, and engage the first and second input disks 512 and 532 closer toward the input and output axis of rotation 510. This arrangement produces the lowest speed ratio (e.g., speed ratio=(rotational speed of output shaft 44)÷(rotational speed of input shaft 42)), wherein the output shaft 44 has a lower rotational speed than the input shaft 42.

FIG. 22 illustrates the speed ratio selector 506 arranged in a second speed ratio position. In this position the first and second ring members 548 and 550 engage the first and second output disks 514 and 534 near their respective outer edges 524 and 542, and engage the first and second input disks 512 and 532 closer toward the input and output axis of rotation 510. This arrangement produces the lowest speed ratio (e.g., speed ratio=(rotational speed of output shaft 44)÷(rotational speed of input shaft 42)), wherein the output shaft 44 has a lower rotational speed than the input shaft 42. The speed ratio selector 506 may be infinitely adjustable between the first speed ratio position (for example, as illustrated in FIGS. 20 and 21) and the second speed ratio position (for example, as illustrated in FIG. 22). The illustrated speed ratio selector 506 is configured to provide a shift ratio of 1:1, but may also be configured to provide other speed ratios depending on the design and performance requirement of a particular application.

The configuration of the first drive mechanism 502 of the continuously variable drive mechanism 500 is such that a sum of the radial location 602 of the first input contact patch 598 and the radial location 604 of the first output contact patch 600 is greater than the radius 562 of the first ring member input traction surface 558 and the radius 564 of the first ring member output traction surface 560. The following holds true for all speed ratios:

((radius 602)+(radius 604))>(radius 562)      A.

((radius 602)+(radius 604))>(radius 564)      B.

A similar relationship also holds true for the second drive mechanism 504. For example, the configuration of the second drive mechanism 504 of the continuously variable transmission 500 is such that a sum of the radial location 610 of the second input contact patch 606 and the radial location 612 of the second output contact patch 608 is greater than the radius 578 of the second ring member input traction surface 574 and the radius 580 of the second ring member output traction surface 576. The following holds true for all speed ratios:

((radius 610)+(radius 612))>(radius 578)      A.

((radius 610)+(radius 612))>(radius 580)      B.

It is intended that the scope of the present methods and apparatuses be defined by the following claims. However, it must be understood that the various disclosed configurations and operation of the continuously variable transmission may be practiced otherwise than is specifically explained and illustrated without departing from its spirit or scope. It should be understood by those skilled in the art that various alternatives to the configurations described herein may be employed in practicing the claims without departing from the spirit and scope as defined in the following claims. The scope of the disclosed systems and methods should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. Furthermore, all terms used in the claims are intended to be given their broadest reasonable constructions and their ordinary meanings as understood by those skilled in the art unless an explicit indication to the contrary is made herein. In particular, use of the singular articles such as "a," "the," "said," etc., should be read to recite one or more of the indicated elements unless a claim recites an explicit limitation to the contrary. It is intended that the following claims define the scope of the device and that the method and apparatus within the scope of these claims and their equivalents be covered thereby. In sum, it should be understood that the device is capable of modification and variation and is limited only by the following claims.

What is claimed is:

1. A continuously variable transmission comprising:
an input disk rotatable about a disk axis of rotation, the input disk including an input disk traction surface;
an output disk rotatable about the disk axis of rotation, the output disk including an output disk traction surface;
an input ring member rotatable about an input axis of rotation, the input ring member including an input ring traction surface located at an input ring traction surface radial distance from the input axis of rotation, the input ring traction surface engaging the input disk traction surface at an input contact patch oriented perpendicular to a first input contact patch vector extending from the input contact patch to the disk axis of rotation and a second input contact patch vector extending from the input contact patch to the input axis of rotation;

an output ring member rotatable about an output axis of rotation, the output ring member including an output ring traction surface located at an output ring traction surface radial distance from the output axis of rotation, the output ring traction surface engaging the output disk traction surface at an output contact patch located at an output contact patch oriented perpendicular to a first output contact patch vector extending from the output contact patch to the disk axis of rotation and a second output contact patch vector extending from the output contact patch to the output axis of rotation; and wherein a sum of a length of the first input contact patch vector and a length of the first output contact patch vector is greater than a length of at least one of the second input contact patch vector and the second output contact patch vector.

2. The continuously variable transmission of claim 1, wherein:
the input disk includes a first input disk and a second input disk positioned adjacent the first input disk, the second input disk moveable axially relative to the first input disk along the disk axis of rotation; and
the output disk includes a first output disk and a second output disk positioned adjacent the first output disk, the second output disk attached to the second input disk for concurrent axial movement along the disk axis of rotation.

3. The continuously variable transmission of claim 2, wherein the second output disk is moveable axially relative to the first output disk along the disk axis of rotation.

4. The continuously variable transmission of claim 2 further comprising an inner intermediate shaft connecting the first input disk to the first output disk and an outer intermediate shaft connecting the second input disk to the second output disk.

5. The continuously variable transmission of claim 4 further comprising a speed ratio selector having a proximal end attached to the outer intermediate shaft and an opposite distal end, the speed ratio selector operable to selectively adjust a position of the disk axis of rotation relative to at least one of the input axis of rotation and the output axis of rotation.

6. The continuously variable transmission of claim 1, wherein the input ring traction surface radial distance is substantially equal to the output ring traction surface radial distance.

7. The continuously variable transmission of claim 1, wherein the input ring member is attached to an input shaft for concurrent rotation therewith and the output ring member is attached to an output shaft for concurrent rotation therewith.

8. The continuously variable transmission of claim 1, wherein the input axis of rotation is displaced from the output axis of rotation.

9. The continuously variable transmission of claim 1, wherein the disk axis of rotation is aligned substantially parallel to at least one of the input axis of rotation and the output axis of rotation.

10. The continuously variable transmission of claim 1, wherein the input disk is interconnected to the output disk for concurrent rotation therewith.

11. The continuously variable transmission of claim 1, wherein a position of the disk axis of rotation is adjustable relative to at least one of the input axis of rotation and the output axis of rotation.

12. A continuously variable transmission comprising:
an input drive member rotatable about an input axis of rotation, the input drive member including an input drive member traction surface;
an output drive member rotatable about an output axis of rotation, the output drive member including an output drive member traction surface;
a ring member rotatable about a ring member axis of rotation, the ring member including:
an input ring traction surface located at an input ring traction surface radial distance from the ring member axis of rotation, the input ring traction surface engaging the input drive member traction surface at an input contact patch oriented perpendicular to a first input contact patch vector length extending from the input contact patch to the input axis of rotation and a second input contact patch vector length extending from the input contact patch to the ring member axis of rotation; and
an output ring traction surface located at an output ring traction surface radial distance from the ring member axis of rotation, the output ring traction surface engaging the output drive member traction surface at an output contact patch oriented perpendicular to a first output contact patch vector length extending from the output contact patch to the output axis of rotation and a second output contact patch vector length extending from the output contact patch to the ring member axis of rotation; and
wherein a sum of the first input contact patch vector length and the first output contact patch vector length is greater than at least one of the second input contact patch vector length and the second output contact patch vector length.

13. The continuously variable transmission of claim 12, wherein:
the input drive member includes a first input member and a second input member positioned adjacent the first input member, the second input member moveable axially relative to the first input member along the input axis of rotation; and
the output drive member includes a first output member and a second output member positioned adjacent the first output member, the second output member moveable axially relative to the first output member along the output axis of rotation.

14. The continuously variable transmission of claim 13 further comprising a speed ratio selector connected to the second input member and the second output member, the speed ratio selector operable for concurrently moving the second input member and the second output member axially along the output axis of rotation.

15. The continuously variable transmission of claim 14, wherein the speed ratio selector operates to concurrently move the second input member and the second output member in opposite directions.

16. The continuously variable transmission of claim 12, wherein the input ring traction surface radial distance is substantially equal to the output ring traction surface radial distance.

17. The continuously variable transmission of claim 12, wherein the input drive member is attached to an input shaft for concurrent rotation therewith and the output drive member is attached to an output shaft for concurrent rotation therewith.

18. The continuously variable transmission of claim 12, wherein the input axis of rotation is displaced from the output axis of rotation.

19. The continuously variable transmission of claim 12, wherein the input axis of rotation substantially coincides with the output axis of rotation.

20. The continuously variable transmission of claim 12, wherein the ring member axis of rotation is aligned substantially parallel to at least one of the input axis of rotation and the output axis of rotation.

21. The continuously variable transmission of claim 12, wherein a position of the ring member axis of rotation is adjustable relative to at least one of the input axis of rotation and the output axis of rotation.

22. The continuously variable transmission of claim 12, wherein the ring member is moveable axially along the ring member axis of rotation.

23. A continuously variable transmission comprising:
   an input disk rotatable about a disk axis of rotation, the input disk including an input disk traction surface;
   an output disk rotatable about the disk axis of rotation, the output disk including an output disk traction surface;
   a ring member rotatable about a ring member effective axis of rotation, the ring member comprising:
      an input ring traction surface located at an input ring traction surface radial distance from the input axis of rotation, the input ring traction surface engaging the input disk traction surface at an input contact patch radial distance from the disk axis of rotation; and
      an output ring traction surface located at an output ring traction surface radial distance from the output axis of rotation, the output ring traction surface engaging the output disk traction surface at an output contact patch located at an output contact patch radial distance from the disk axis of rotation; and
   wherein a sum of the input contact patch radial distance and the output contact patch radial distance is greater than at least one of the input ring traction surface radial distance and the output ring traction surface radial distance.

24. The continuously variable transmission of claim 23 further comprising a speed ratio selector connected to the ring member, the speed ratio selector operable to selectively adjust a position of the ring member effective axis of rotation relative to at least one of the input axis of rotation and the output axis of rotation.

25. The continuously variable transmission of claim 24, wherein the speed ratio selector is rotatably connected to a housing so as to be rotatable about the ring member effective axis of rotation, the ring member being rotatably connected to the speed ratio selector.

26. The continuously variable transmission of claim 25, wherein the speed ratio selector includes a radial offset that varies circumferentially.

27. The continuously variable transmission of claim 23, wherein the input drive member is attached to an input shaft for concurrent rotation therewith and the output drive member is attached to an output shaft for concurrent rotation therewith.

28. The continuously variable transmission of claim 23, wherein the ring member effective axis of rotation is aligned substantially parallel to at least one of the input axis of rotation and the output axis of rotation.

29. The continuously variable transmission of claim 23, wherein a position of the ring member effective axis of rotation is adjustable relative to at least one of the input axis of rotation and the output axis of rotation.

* * * * *